(12) United States Patent
Kato et al.

(10) Patent No.: US 7,518,774 B2
(45) Date of Patent: Apr. 14, 2009

(54) OPTICAL DEFLECTOR AND OPTICAL INSTRUMENT USING THE SAME

(75) Inventors: Takahisa Kato, Tokyo (JP); Kazutoshi Torashima, Kanagawa-ken (JP); Yukio Furukawa, Mountain View, CA (US); Yasuhiro Shimada, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/146,561

(22) Filed: Jun. 26, 2008

(65) Prior Publication Data

US 2008/0266632 A1 Oct. 30, 2008

Related U.S. Application Data

(62) Division of application No. 11/753,062, filed on May 24, 2007, now Pat. No. 7,423,795.

(30) Foreign Application Priority Data

May 30, 2006 (JP) .............................. 2006-149940

(51) Int. Cl.
*G02B 26/08* (2006.01)
(52) U.S. Cl. ..................................... 359/224; 359/291
(58) Field of Classification Search ......... 359/223–226, 359/290, 291, 871, 872
See application file for complete search history.

(56) References Cited

U.S. PATENT DOCUMENTS

| | | | |
|---|---|---|---|
| 4,859,846 A | 8/1989 | Burrer | |
| 5,610,752 A * | 3/1997 | Hayakawa | ................... 359/198 |
| 6,201,226 B1 | 3/2001 | Shimada et al. | |
| 6,215,114 B1 | 4/2001 | Yagi et al. | |
| 6,327,087 B1 | 12/2001 | Hashimoto et al. | |
| 6,333,497 B2 | 12/2001 | Shimada et al. | |
| 6,335,522 B1 | 1/2002 | Shimada et al. | |
| 6,408,123 B1 | 6/2002 | Kuroda et al. | |
| 6,477,132 B1 | 11/2002 | Azuma et al. | |
| 6,900,925 B2 | 5/2005 | Kato et al. | |
| 7,038,834 B2 | 5/2006 | Kato et al. | |
| 2002/0158548 A1* | 10/2002 | Min et al. | .................... 359/298 |
| 2005/0088715 A1 | 4/2005 | Yoda | |

(Continued)

FOREIGN PATENT DOCUMENTS

JP 6-269186 9/1994

(Continued)

*Primary Examiner*—Euncha P Cherry
(74) *Attorney, Agent, or Firm*—Fitzpatrick, Cella, Harper & Scinto

(57) ABSTRACT

An optical deflector includes an oscillating system and a driving system for driving the oscillating system, the oscillating system including a first oscillator, a first torsion spring, a second oscillator, a second torsion spring and a supporting member, the first oscillator including a first movable element having a light deflecting element configured to deflect light, the second oscillator including a second movable element having a mass adjusting member configured to adjust a mass, wherein the first movable element is resiliently supported by the second movable element through the first torsion spring, for torsional oscillation about an oscillation axis, wherein the second movable element is resiliently supported by the supporting member through the second torsional spring, for torsional oscillation about the oscillation axis, and wherein the oscillating system has at least two natural oscillation modes having different frequencies, about the oscillation axis.

7 Claims, 14 Drawing Sheets

U.S. PATENT DOCUMENTS

| | | |
|---|---|---|
| 2005/0128552 A1 | 6/2005 | Yasuda et al. |
| 2006/0132883 A1 | 6/2006 | Saitoh |
| 2006/0152785 A1 | 7/2006 | Yasuda et al. |
| 2006/0198006 A1 | 9/2006 | Kato et al. |
| 2007/0144867 A1 | 6/2007 | Torashima et al. |

FOREIGN PATENT DOCUMENTS

| | | |
|---|---|---|
| JP | 2002-040355 | 2/2002 |
| JP | 2004-219889 | 8/2004 |
| JP | 2005-250078 | 9/2005 |
| JP | 2005-279863 | 10/2005 |
| JP | 2006-130587 | 5/2006 |

\* cited by examiner

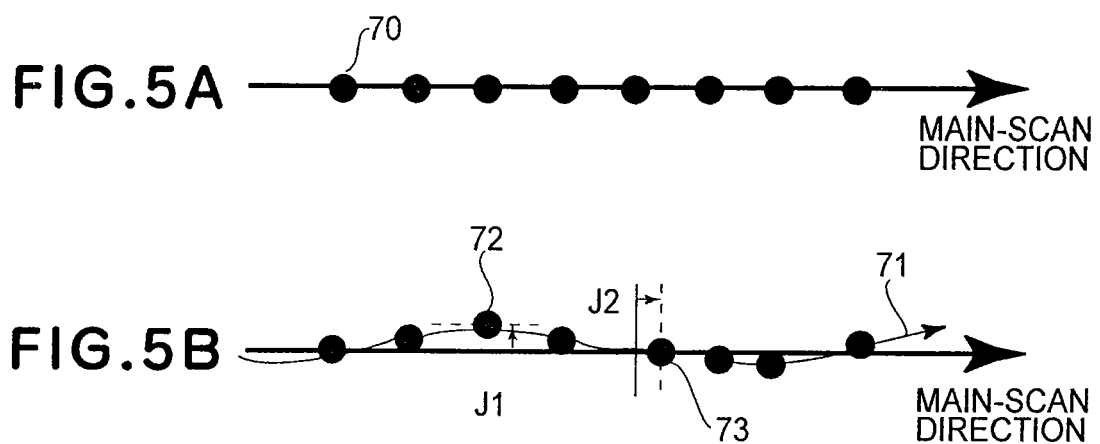
FIG.5A
FIG.5B
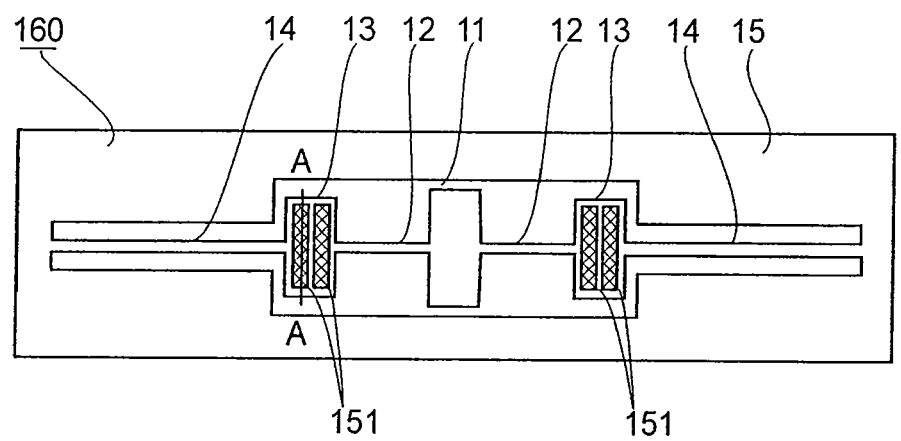
FIG.6

OPTICAL DEFLECTOR AND OPTICAL INSTRUMENT USING THE SAME

FIELD OF THE INVENTION AND RELATED ART

This invention relates to an optical deflector and a method of producing the same, as well as an optical instrument such as an image forming apparatus or a display device, for example, using such optical deflector. The optical deflector of the present invention is suitably usable in a projection display wherein an image is projected based on deflective scan of light, or an image forming apparatus such as a laser beam printer or digital copying machine having an electrophotographic process, for example.

With regard to such optical deflectors, various types of optical scanning systems or optical scanning devices wherein a movable element having a reflection surface is sinusoidally oscillated to deflect light have been proposed. Optical scanning systems with an optical deflector sinusoidally oscillated based on a resonance phenomenon have advantageous features, as compared with scanning optical systems using a rotary polygonal mirror (polygon mirror), such as follows. That is, the optical deflector can be made quite small in size; the power consumption is low; and particularly those optical deflectors made of Si monocrystal and produced by semiconductor processes are theoretically free from metal fatigue and have good durability.

In such optical deflectors, with respect to a driving frequency desired, the frequency of a natural oscillation mode to be targeted is predetermined. There are some good proposals for production method of the same. An example is that: a planar galvano mirror comprising a movable plate having a reflection surface and a coil and being resiliently supported for oscillating motion with respect to a torsional axis, is provided with mass load portions at the opposite ends of the movable plate, and a laser beam is projected thereto to remove the mass so as to adjust the moment of inertia and acquire a desired frequency (see Patent Document No. 1 below).

Another example is that: a movable plate is coated with a mass piece such as, typically, resin, and the frequency is adjusted based on the principle described above (see Patent Document No. 2)

On the other hand, some of the optical deflectors based on the resonance phenomenon use a method that two or more natural oscillation modes in the torsional oscillation direction are simultaneously exited to perform optical scanning different from the sinusoidal optical scan. This concerns such optical deflectors that two or more natural oscillation modes about the same central axis are simultaneously excited to produce chopping-wave-like approximately constant angular-speed scan (see Patent Document No. 3). FIG. 18 is a block diagram for explaining this type of optical deflector.

In FIG. 18, the optical deflector generally denoted at 1012 comprises a first movable element 1014, a second movable element 1016, a first torsion spring 1018 for connecting and resiliently supporting them, and a second torsion spring 1020 for resiliently supporting the second movable element 1016 and a mechanical ground surface 1023. All of these components can be torsionally oscillated about a torsional axis 1026, by means of a driving unit 1030. The first movable element 1014 has a reflection surface for deflecting light and, in response to the torsional oscillation of the first movable element 1014, light from a light source is scanningly deflected. With regard to the torsional oscillation about the torsional axis 1026, the optical deflector 1012 has a first-order natural oscillation mode of a reference frequency and a second-order natural oscillation mode of a frequency approximately triple the reference frequency. The driving unit 1030 drives the optical deflector 1012 at two frequencies: that is, the frequency of the first-order natural oscillation mode and the frequency which is triple the former but has the same phase. Hence, the optical deflector 1012 is torsionally oscillated based on the first-order natural oscillation mode as well as the second-order natural oscillation mode, simultaneously. As a result, the displacement angle of deflective scan of the light as reflected by the first movable element 1014 is based on superposition of these two oscillation modes, and it changes approximately chopping-wave like, not sinusoidally. As a result, with regard to the angular speed of deflective scan, the approximately constant angular-speed region becomes broader as compared with the displacement angle based on sinusoidal waves. Hence, the ratio of available region to the whole deflective scan range may be larger.

On the other hand, the first movable element 1014 has a displacement detecting reflection surface 1015 formed at the back of the deflective scanning reflection surface thereof. A displacement detecting means 1032 projects light onto the displacement detecting reflection surface 1015, and detects reflection light therefrom to thereby detect the displacement angle of the first movable element 1014. A displacement angle detection signal goes through a signal line 1034 and, by means of a bandpass filter circuit 1036, only the frequency component of the first-order natural oscillation mode is supplied to a first signal line 1038 and a second signal line 1040. The signal from the first signal line 1038 is applied to a multiplier 1042 by which the signal is converted into a triple-frequency signal. To this end, the multiplier 1042 is equipped with a phase adjusting input 1054 and an amplitude adjusting input 1055. By means of these two inputs, the phase and maximum amplitude of the output signal of the multiplier 1042 can be adjusted so that the displacement of deflective scan of the first movable element as detected by the displacement detecting means 1032 takes an appropriate approximately-chopping-wave shape.

The signal from the multiplier 1042 is inputted to an adder 1046. The adder 1046 adds the signal from the multiplier 1042 and the frequency signal of the first-order natural oscillation mode, passed through the second signal line 1040 and an automatic gain control circuit 1060, and produces a driving signal for the optical deflector 1012. This driving signal is supplied through a signal line 1048 to a driving circuit 1050 by which the driving means 1023 is driven based on a combined waveform of the first-order natural oscillation mode and the triple-frequency signal.

The automatic gain control circuit 1060 comprises a peak detecting circuit 1056, a differential amplifying circuit 1061, a preset amplitude 1063, an amplifier 1062 and a gain control circuit 1064. The second signal line 1040 mentioned above is split into two signal lines 1040a and 1040b. A signal from the signal line 1040a is used to detect, through the differential amplifying circuit 1061, the difference between the largest amplitude as detected by the peak detecting circuit 1056 and the preset amplitude 1063 which is an amplitude value determined beforehand. A resultant differential signal is supplied to the amplifier 1062 that controls the gain control circuit 1064, and this signal is used to control the gain control circuit 1064 so that the signal from the signal line 1040b has the same gain as the preset amplitude 1063.

[Patent Documents]
No. 1: Japanese Laid-Open Patent Application No. 2002-40355
No. 2: Japanese Laid-Open Patent Application No. 2004-219889
No. 3: U.S. Pat. No. 4,859,846

SUMMARY OF THE INVENTION

However, in the optical deflectors based on resonance phenomenon such as described above, it is not easy to assure a large scan angle and high scanning reproducibility at the same time. Furthermore, in oscillation systems having plural oscillators and plural torsion springs, deviation of frequencies easily occurs due to factors such as process tolerance. It is therefore desirable in such oscillation system to assure high scanning reproducibility and easy adjustability for adjusting the frequency of plural natural oscillation modes exactly as desired.

In accordance with an aspect of the present invention, there is provided an optical deflector, comprising: an oscillating system; and a driving system configured to drive said oscillating system; wherein said oscillating system includes a first oscillator, a first torsion spring, a second oscillator, a second torsion spring and a supporting member, wherein said first oscillator includes a first movable element having a light deflecting element configured to deflect light, wherein said second oscillator includes a second movable element having a mass adjusting member configured to adjust a mass, wherein said first movable element is resiliently supported by said second movable element through said first torsion spring, for torsional oscillation about an oscillation axis, wherein said second movable element is resiliently supported by said supporting member through said second torsional spring, for torsional oscillation about the oscillation axis, and wherein said oscillating system has at least two natural oscillation modes having different frequencies, about the oscillation axis.

In accordance with another aspect of the present invention, there is provided a method of producing an optical deflector as recited above, comprising: a step of projecting laser light to said mass adjusting member to remove a portion of said mass adjusting member.

In accordance with a further aspect of the present invention, there is provided an optical instrument, comprising: a light source; an optical deflector as recited above; and one of a photosensitive member and an image display member; wherein said optical deflector is configured to deflect light from said light source and to direct at least a portion of the deflected light onto said photosensitive member or image display member.

An optical deflector according to an aspect of the present invention may have plural natural oscillation modes, wherein one (second) of plural oscillators may be provided with a mass adjusting member for adjusting the mass. This enables simple and easy adjustment of the frequency of the natural oscillation modes, and good scanning reproducibility is assured.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5A is a schematic view for explaining idealistic scanning reproducibility.

FIG. 5B is a schematic view for explaining deterioration of the scanning reproducibility due to scan position shift.

FIG. 6 is a plan view, showing the structure at a side of the oscillating system where no reflection surface is formed, in the first working example of the present invention.

DESCRIPTION OF THE PREFERRED EMBODIMENTS

Figure 1:
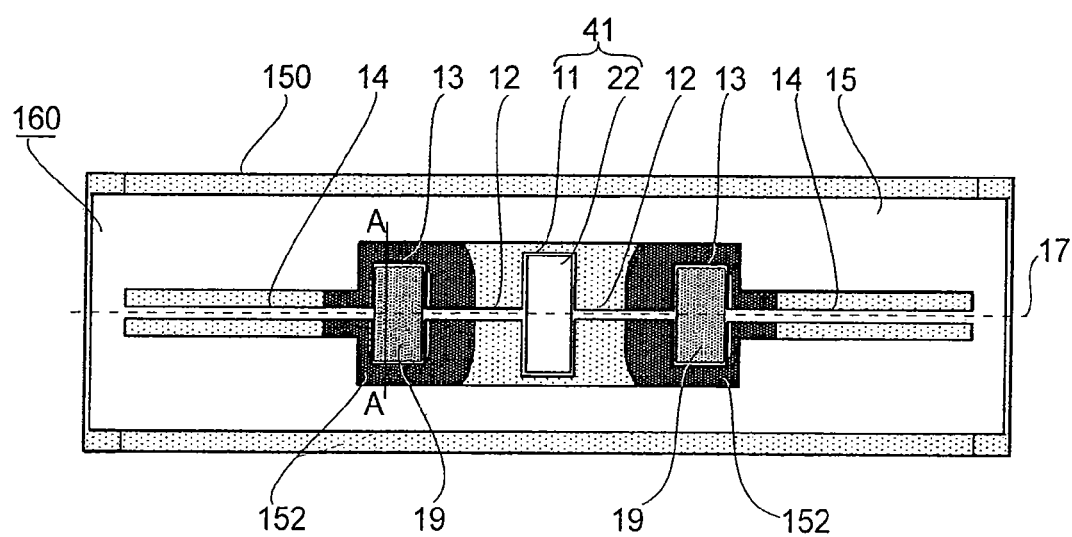
FIG. 1 is a plan view of an optical deflector according to a first working example of the present invention.

Preferred embodiments of the present invention will now be described with reference to the attached drawings.

One embodiment of the present invention will be described below. This embodiment concerns an oscillating system having plural oscillators, wherein a mass adjusting member may be provided only at a second oscillator having no reflection surface (light deflecting element), so that the frequency of plural natural oscillation modes can be set exactly at a desired value. Thus, good scanning reproducibility is assured. Typically, for enhanced effect of using such mass adjusting member, the mass adjusting member and a magnet which may be a component of a driving unit may be disposed sandwiching an oscillation axis therebetween. The magnet and the mass adjusting member may preferably be disposed sandwiching the oscillation axis and at opposite surfaces of the second oscillator. In that case, they may be disposed in the manner to be described later with reference to a working example, or they may be disposed diagonally while sandwiching the oscillation axis. As a further alternative, they may be disposed on the same surface of the second oscillator while sandwiching the oscillation axis therebetween. Anyway, by disposing the magnet and the mass adjusting member as described, the gravity center of the second oscillator can be approximately aligned with the oscillation axis, and good scanning reproducibility is assured.

An optical deflector according to this embodiment for scanningly deflecting light from a light source may comprise an oscillating system, a stationary member for holding the oscillating system, and a driving unit for driving the oscillating system, wherein the driving system may include a magnet and a coil, for example, to be described later. The driving unit may use an electrostatic force, a piezoelectric device and so on. The oscillating system may include a first oscillator, a first torsion spring, a second oscillator, a second torsion spring and a supporting member. The first oscillator may comprise a first movable element having a reflection surface for reflecting light from a light source. The second oscillator may comprise a second movable element having a mass adjusting member for adjusting the mass of the second oscillator. A magnet may be added thereto, to produce a torque in response to a magnetic field from a stationary coil of the driving unit.

The first movable element may be resiliently supported by the first torsion spring (resiliently supporting means) for torsional oscillation about the oscillation axis, relative to the second movable element. The second movable element may be resiliently supported by the second torsion spring (resiliently supporting means) for torsional oscillation about the oscillation axis, relative to the supporting member. The supporting member may be fixed to the stationary member. The oscillating system may have at least two natural oscillation modes of different frequencies, and the driving unit may cause torsional oscillation of the oscillating system about the torsional axis, simultaneously at around the frequencies of these natural oscillation modes.

In the optical deflector according to this embodiment having such oscillating system as described, the mass adjusting member (typically, a magnet may be added thereto) may be provided only at the second oscillator. Hence, the moment of inertia thereof can be made larger than the first oscillator. Consequently, in this embodiment, if the moment of inertia of one of the first and second oscillators has to be adjusted, only the frequency of a particular natural oscillation mode, out of the plural natural oscillation modes, can be selectively and satisfactorily adjusted. For adjustment of the first oscillator, a portion of the oscillator body may be removed or, alternatively, a mass may be added thereto. The principle of selective adjustability to the frequency of a particular natural oscillation mode will be described later.

Furthermore, in this embodiment, due to the effect of the magnet and the mass adjusting member, the scanning reproducibility of the optical deflector increases. Generally, in optical deflectors, the reproducibility of amplitude, phase, light spot scan speed and light spot locus during successive scan operations is very important. If these values shift during successive scans, it directly leads to degradation of image quality where the optical deflector is used in an image forming apparatus.

Here, a first factor that causes deterioration of the scanning reproducibility is the resistance which the oscillator receives from the ambience during the oscillation. If the size of the oscillator in a direction perpendicular to the oscillation axis (namely, it is in the direction of the moment arm of inertia about the oscillation axis of torsional oscillation, and it may be called "width of oscillator") is large, the outer peripheral portion of the oscillator stirs the ambience so fast. This causes a disturbed flow, and the magnitude of air resistance would vary every scan. In the optical deflectors based on resonance phenomenon of oscillators, such variation of resistance does correspond to variation of viscous damping, and the scanning reproducibility is degraded thereby.

By using a magnet and a mass adjusting member as described above, the moment of inertia of the second oscillator as a whole can be kept larger than the first oscillator while reducing the width of the second oscillator. Typically, a magnet may be provided only at the second oscillator. While making use of the magnet as a torque generating source, the mass of the magnet can be used as the moment of inertia. Therefore, without specifically securing the place for mounting a driving unit, the width of the second oscillator can be made small.

The function for providing the moment of inertia to the second oscillator may be shared between the magnet and the mass adjusting member. Hence, by partly removing the mass adjusting member, the adjustable range for the moment of inertia can be widened. Furthermore, if the volume and density of the mass adjusting member are chosen appropriately, the frequency bandwidth of the natural oscillation mode to be adjusted can be enlarged by the step of partly removing the mass adjusting member.

Particularly, a light absorptive material may be used as the mass adjusting member, and this makes it possible to use laser beam machining. Thus, high-precision and high-speed mass removing operation is enabled in that occasion.

A second factor that causes deterioration of the scanning reproducibility is unwanted oscillation about the oscillation axis. If there is translating motion or oscillating motion about any other axis, together with the torsional oscillation about the oscillation axis, the torsional oscillation of the optical deflecting surface would be a combined motion, being combined with such unwanted oscillation. This would cause variation of the amplitude, phase, light spot scan speed and light spot locus during successive scan operations.

Simultaneously, depending on the direction of kinematic motion, the unwanted oscillation components such as described above would cause an exciting force having a characteristic frequency, different from the driving frequency, this being described later with reference to a working example. In this embodiment, the oscillating system may have a plurality of oscillators resiliently supported by torsion springs, and plural natural oscillation modes about the oscillation axis may be used. If there is an exciting force of a characteristic frequency based on unwanted oscillation components, a natural oscillation mode different from the natural oscillation mode that the components of the driving signal are just going to excite would be excited thereby. As a result, the natural oscillation mode about the oscillation axis couldn't be independent any more, and coupled oscillation would results. If such coupled oscillation occurs, the amplitude, phase, light spot scan speed and light spot locus change during successive scan operations. Thus, the scanning reproducibility is largely degraded by this.

In the oscillating system of this embodiment using torsional oscillation about the oscillation axis, it is possible that a large displacement occurs in the torsional oscillation direction. Therefore, if there is a gravity center shift from the oscillation axis, it causes a large inertia force, and such inertia force would result in unwanted oscillation as described above. The larger the scan angle used is, the larger the possibility is. Thus, this is a critical problem when the optical deflector is incorporated into an image forming apparatus. In this embodiment, typically the magnet and the mass adjusting member may be disposed sandwiching the oscillation axis therebetween. Namely, the gravity center of the second oscillator can be approximately aligned with the oscillation axis. With this arrangement, coupled oscillation between the unwanted oscillation and the natural oscillation mode can be well avoided, and good scanning reproducibility is assured. Furthermore, even if there is gravity center shift due to process tolerance, for example, by partly removing the mass adjusting member, the gravity center position can be adjusted to be approximately aligned with the oscillation axis.

With regard to the first movable element on which a light deflecting element such as a reflection surface is formed, the flatness thereof is very important to obtain good reflection light spot. The first movable element may be deformed for the following factors. First, the angular acceleration corresponding to the torsional oscillation will cause deformation of the first movable element. Furthermore, expansion of the member due to any change in external environment such as temperature or humidity will cause deformation. In this embodiment, typically the magnet and the mass adjusting member may be provided only at the second movable element (i.e., not provided at the first movable element), and this avoids deformation of the first movable element described above. Thus, good optical scanning characteristics are obtainable.

In this embodiment of the present invention, as described above, based on the effect of the mass adjusting member (a magnet may be added thereto) which may be provided only at the second movable element, the frequency of plural natural oscillation modes can be adjusted easily and exactly to a desired value and, moreover, good scanning reproducibility is assured.

Hence, where image formation or image display is going to be made, not only the scanning reproducibility is improved but also the relationship between the position and speed of the optical scan is stabilized even if a lens is disposed behind the optical deflector. Thus, a good optical scanning unit is successfully accomplished.

An optical instrument such as image display device or image forming apparatus with an optical deflector according to this embodiment of the present invention, may include a light source, the aforementioned optical deflector and a photosensitive member or image display member. The optical deflector may function to deflect the light from the light source and direct at least a portion of the deflected light onto the photosensitive member or image display member.

Next, specific working examples of the present invention will be described with reference to the drawings.

FIRST WORKING EXAMPLE

Figure 2A:
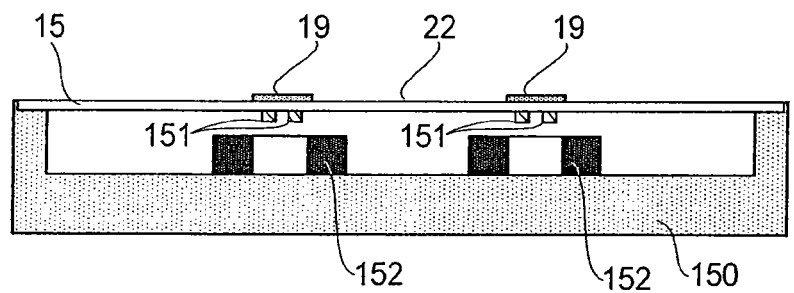
FIG. 2A is a longitudinal section of the optical deflector according to the first working example of the present invention.
Figure 2B:
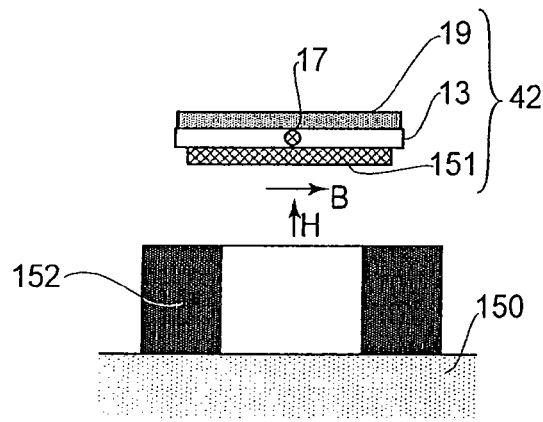
FIG. 2B is a cross-section of the optical deflector according to the first working example of the present invention, taken along a line A-A in FIG. 1.

FIGS. 1, 2A, 2B and 6 show an optical deflector according to a first working example of the present invention. Here, FIG. 1 is a plan view. FIG. 2A is a sectional view taken along a plane containing an oscillation axis 17 of FIG. 1 and perpendicular to the sheet of FIG. 1. FIG. 2B is a sectional view taken along a line A-A in FIG. 1. FIG. 6 is a plan view of components of an oscillating system 160 of FIG. 1, as viewed from the bottom. The oscillating system 160 includes a reflection surface 22, a first oscillator 41, first torsion springs 12, a second oscillator 42, second torsion springs 14 and a supporting member 15.

The first oscillator 41 comprises a first movable element having a reflection surface 22 formed thereon as an optical deflecting element for deflecting light. The reflection surface 22 is made of aluminum and formed by vapor deposition. This reflection surface may be made of any other materials such as gold or copper, for example. A protection film may be formed at the topmost surface thereof.

As shown in FIGS. 1, 2A and 2B, the second oscillator 42 comprises a pair of second movable elements 13 each having permanent magnets 151 and a mass adjusting member 19. Since the mass adjusting member 10 and the permanent magnets 151 are disposed at opposite surfaces of the movable element, sandwiching the oscillation axis 17 therebetween, the respective gravity center positions of the mass adjusting member 19 and the permanent magnet 151 are placed approximately in a point-symmetrical relationship with each other with respect to the oscillation axis 17. Thus, the gravity center position of each second oscillator 42 (movable element 13) is approximately aligned with the position of the oscillation axis 17. The mass adjusting member 19 is a plate-like member made of phosphor bronze, and it is fixed to the second movable element 13 by an adhesive agent. The mass adjusting member 19 may be made of a material such as metal, dielectric material or semiconductor, for example, which absorbs a machining laser beam to be described later. The number of used permanent magnets is four (two pairs) in this example as illustrated. However, any number may be used as desired.

The driving principle in this working example will be explained below, together with the structure thereof. In this example, the oscillating system 160 shown in FIG. 1 makes torsional oscillation about the oscillation axis 17, through the driving unit to be described below. The oscillating system 160 shown in FIG. 1 and including first movable element 11, first torsion springs 12, second movable elements 13, second torsion springs 14 and supporting member 14, is produced integrally from a monocrystal silicon substrate by means of a photolithographic process and an etching process according to the semiconductor manufacturing method. Hence, the processing precision is very high, and a quite small oscillating system can be produced. Furthermore, since monocrystal silicon has a high Young's modulus and a small density, deformation due to the self-weight of the oscillator is very small. Therefore, an oscillating system having a large amplitude amplification factor during the resonance is accomplished.

In this working example, the first movable element 11 has a size 3 mm in a direction perpendicular to the oscillation axis 17 and a size 1 mm in a direction parallel to that axis. The whole length of the oscillating system 160 is about 20 mm. The first oscillator 41 is resiliently supported by a pair of first torsion springs 12, for torsional oscillation about the oscillation axis 17. As shown in the drawings, the second oscillator 42 actually comprises a pair of oscillators disposed along the oscillation axis 17 direction while sandwiching the first oscillator 41 therebetween. Each of the second oscillators 42 is resiliently supported by the supporting member 15 and the second torsion spring 14, for torsional oscillation about the oscillation axis 17. Thus, the first oscillator 41 and the paired second oscillators 42 are disposed in series and resiliently supported, for torsional oscillation about the oscillation axis 17.

Here, since the first movable element 11 should be formed with a reflection surface 22, the flatness thereof during driving is particularly important. The first movable element 11 of this example is supported at its opposite ends by means of a pair of torsion springs 12. Hence, as compared with the single-spring support, deformation due to the self-weight thereof is well avoided, and better flatness can be maintained.

In FIGS. 1, 2A, 2B and 6, a stationary member 150 and a driving unit are illustrated. As shown in the drawings, the driving unit of this working example comprises permanent magnets 151 and fixed coils 152 fixed to the stationary member 150. As shown in FIGS. 2A, 2B and 6, each permanent magnet 151 of the second movable element 13 is a metal magnet of prism-like shape having a length of about 2 mm and a sectional size of 250 μm×250 μm. The permanent magnet 151 has its polarization (magnetization) direction extending along its lengthwise direction, and it is fixed to the second movable element 13 by an adhesive agent.

As seen from FIGS. 2A and 2B, the stationary member 150 serves to appropriately hold the positions of the oscillating system 160, permanent magnets 151 and fixed coils 152. In response to application of a driving AC current, these fixed coils 152 produce an alternating magnetic field in the direction of an arrow H shown in FIG. 2B. Since the magnetic flux density direction of the permanent magnet 151 is in the direction of an arrow B, the magnetic field produced by the fixed coils 152 generates a torque about the oscillation axis 17, and the oscillating system 160 is driven thereby. As shown in FIG. 2A, the opposite ends of the supporting member 15 are fixedly supported by the stationary member 150. Further, as illustrated, the optical deflector of this working example has two fixing points for fixing the supporting member to which the two second torsion springs 14 are respectively connected.

Next, the driving principle of sawtooth-wave-like oscillation of the optical deflector according to this working example will be explained in greater detail. With regard to the torsional oscillation about the torsional axis 17, the oscillating system 160 of this example has a first-order natural oscillation mode of a frequency $f_1$ and a second-order natural oscillation mode of a frequency $f_2$ which is approximately twice a reference frequency. This oscillating system 160 can be treated as an oscillating system having a degree of freedom of "2" with respect to the torsional oscillation.

On the other hand, the fixed coil 152 drives the oscillating system 160 in accordance with a combined driving signal based on the reference frequency $f_0$ (target driving frequency as determined by the specifications of the system application) and a frequency $2f_0$ which is twice the reference frequency. The reference frequency $f_0$ and the natural oscillation mode frequencies $f_1$ and $f_2$ have a relationship described below, and the optical deflector of this example performs combined-wave drive with low power consumption, based on a large dynamic-to-static modulus ratio (amplitude amplification factor) of natural oscillation mode.

Particularly, the natural mode frequency $f_1$ is designed close to the reference frequency $f_0$. Here, if the mode damping ratio (which represents sharpness of the peak, at the natural mode frequency, of the dynamic-to-static modulus ratio curve and which is approximately equal to ½Q) of the first-order and second-order natural oscillation modes is denoted by $\gamma_1$ and $\gamma_2$, respectively, the range thereof is expressed as follows.

$$f_0(1-2\gamma_1) \leq f_1 \leq f_0(1+2\gamma_1) \quad (1)$$

Furthermore, in this specification, the detuning Δ regarding the frequency ratio of the frequencies $f_1$ and $f_2$ is defined as follows, and the range for "approximately multiple by an integer" is determined. The detuning Δ is defined by $\Delta = N(f_1/f_2)$ as an index for that the frequencies $f_1$ and $f_2$ of the oscillating system are in "N times" relationship. For example, in this specification, the words "approximately twice" refer to the range expressed by Equation (2) below.

$$-2(\gamma_1+\gamma_2)+1 < 2\frac{f_1}{f_2} < 2(\gamma_1+\gamma_2)+1 \quad (2)$$

Additionally, in this working example, the frequency ratio is in the following range.

$$-(\gamma_1+\gamma_2)+1 < 2\frac{f_1}{f_2} < (\gamma_1+\gamma_2)+1 \quad (3)$$

In the oscillating system 160 of this example, $\gamma_1$ is abut 0.0007 and $\gamma_2$ is about 0.00025. In this example, by means of the fixed coil 152, oscillations of $f_0$ and $2f_0$ are excited at around the peaks of two natural oscillation modes, and the oscillating system 160 is driven based on it. Particularly, in the range defined by Equation (1), with regard to the oscillation of frequency $f_0$ which is a main component of the consumed electric power for the sinusoidal-wave combined drive, a range having large dynamic-to-static modulus ratio (amplitude amplification factor) of the first-order natural oscillation mode can be used. Therefore, the power consumption of the optical deflector is lowered.

Figure 3:
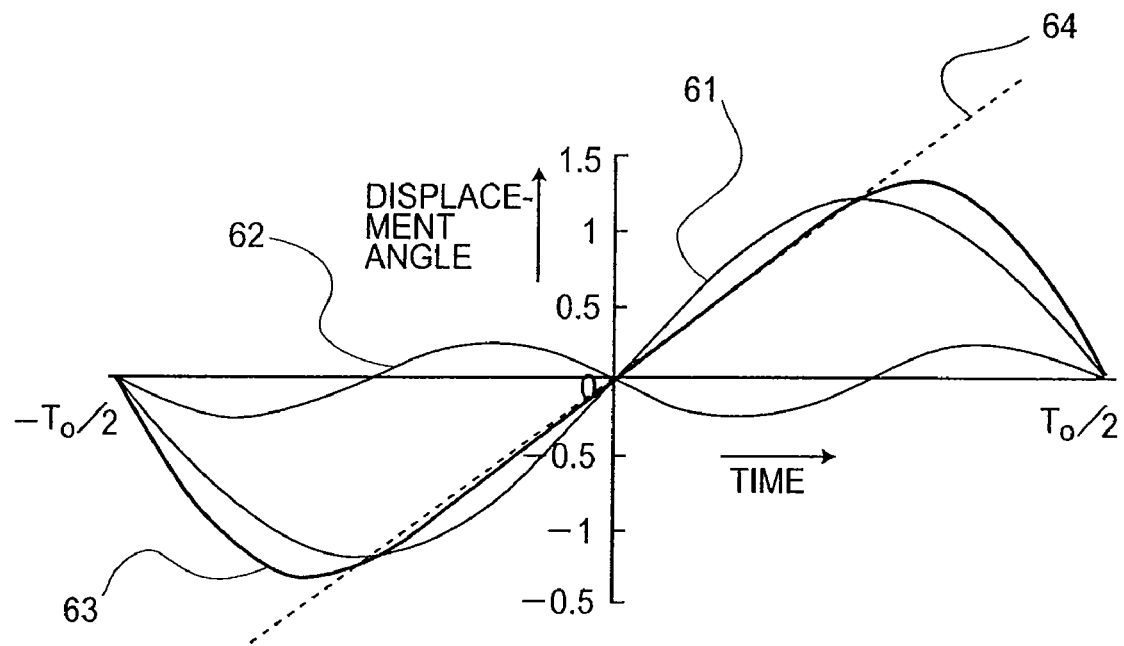
FIG. 3 is a graph for explaining the displacement angle of light scanningly deflected by the optical deflector according to the first working example of the present invention.

The driving method will be explained in more detail. FIG. 3 is a graph with time t taken on the axis of abscissa, and it explains the displacement angle of the first oscillator 11 during torsional oscillation of a frequency $f_0$ (in this specification, since the displacement angle of reciprocal oscillation of the movable element and the displacement angle of light deflectively scanned by the optical deflector are different only with respect to the constant, they are treated as equivalent). Specifically, FIG. 3 illustrates the portion corresponding to one cycle $T_0$ of the torsional oscillation of the first oscillator movable element 11 ($-T_0/2 < X < T_0/2$).

Curve 61 depicts the component of reference frequency $f_0$, of the driving signal that drives the fixed coil 152. It is a sinusoidal oscillation which reciprocally oscillates within the range of largest amplitude $\pm\phi_1$ and is expressed by Equation (4) below, where time is t and angular frequency is $w_0=2\pi f_0$.

$$\theta_1 = \phi_1 \sin[w_0 t] \quad (4)$$

On the other hand, curve 62 depicts the frequency component twice the reference frequency $f_0$, and it is sinusoidal oscillation which oscillates in the range of largest amplitude $\pm\phi_2$ and is expressed by Equation (5) below.

$$\theta_2 = \phi_2 \sin[2w_0 t] \quad (5)$$

Curve 63 depicts the displacement angle of the torsional oscillation of the first oscillator movable element 11 produced as a result of the drive described above. With regard to the torsional oscillation about the torsional axis 17, the optical deflector has a natural oscillation mode of frequency $f_1$ and a second-order natural oscillation mode of frequency $f_2$, being adjusted around the reference frequency $f_0$ and the frequency $2f_0$ twice the reference frequency, as described hereinbefore. Hence, both resonance excited by the driving signal corresponding to $\theta_1$ and resonance excited by the driving signal corresponding to $\theta_2$ occur in the optical deflector. Namely, the displacement angle of the first oscillator movable element 11 in curve 63 is based on the oscillation provided by superposition of these two sinusoidal oscillations; that is, a sawtooth-wave-like oscillation that can be expressed by Equation (6) below is produced.

$$\theta = \theta_1 + \theta_2 = \phi_1 \sin[w_0 t] + \phi_2 \sin[2w_0 t] \quad (6)$$

Figure 4:
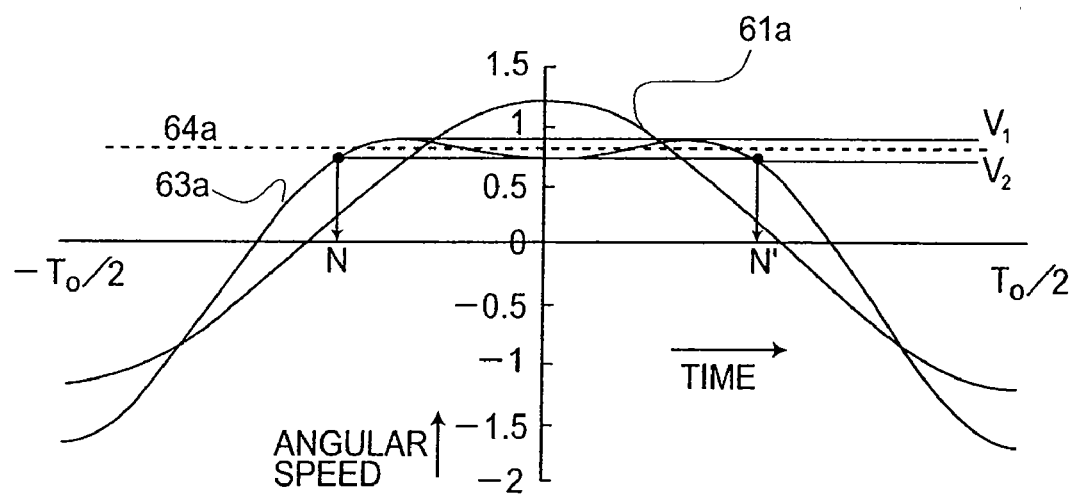
FIG. 4 is a graph for explaining the angular speed of light scanningly deflected by the optical deflector according to the first working example of the present invention.

FIG. 4 shows curves 61*a* and 63*a* and a straight line 64*a*, obtained by differentiating the curves 61 and 63 and a straight line 64 of FIG. 3, and it illustrates the angular speed of these curves. As compared with the curve 61*a* which depicts the angular speed of sinusoidal oscillation of reference frequency $f_0$, the curve 63*a* that depicts the angular speed of sawtooth-wave-like reciprocal oscillation of the first oscillator movable element 11 has a feature that in the section N-N' the angular speed is kept within the range having upper and lower limits corresponding to the angular speed $V_1$ at the maximum and the angular speed $V_2$ at the minimum, respectively. Thus, if, in the application based on optical deflective scan using the optical deflector, $V_1$ and $V_2$ are present within the allowable error range of angular speed from the straight line 64*a* which corresponds to constant angular-speed scan, the section N-N' can be regarded as a substantially constant angular-speed scan region.

As described above, as compared with the oscillation based on the displacement angle following sinusoidal waves, the sawtooth-wave reciprocal oscillation does provide, for the angular speed of deflective scan, a much wider region in which the angular speed is substantially constant. Thus, the ratio of available region to the whole deflective scan region is notably enlarged. Furthermore, the sawtooth-wave based drive ensures regular intervals of scan lines, and this is quite advantageous in the application to printers, for example.

Although the foregoing description has been made with reference to an example wherein the frequencies $f_1$ and $f_2$ of natural oscillation modes have a "double" relationship that the latter is approximately twice the former, a "triple" relationship wherein the latter is approximately three times the former may be set. In that occasion, like the "double" relationship, through the oscillation based on superposition of sinusoidal waves, chopping-wave-like oscillation is provided. Since this enables utilization of reciprocal scan of light, the number of scan lines at a certain available frequency can be doubled.

In accordance with this working example, the permanent magnet 151 and the mass adjusting member 19 are provided only at the second oscillator 42. Therefore, the moment of inertia of the second oscillator 42 can be made larger than that of the first oscillator 41. In this particular example, the former is about 5 times as large as the latter. Because of this relationship of inertial moment, even if the frequencies $f_1$ and $f_2$ are deviated from the reference frequency $f_0$ which is the target driving frequency and the frequency $f_2$ which is twice the reference frequency, respectively, due to any error such as process tolerance or the like, these two frequencies $f_1$ and $f_2$ can be adjusted satisfactorily. Details are as follows.

In the oscillating system 160 of this working example, the frequencies $f_1$ and $f_2$ of the first- and second-order natural oscillation modes about the oscillation axis 17 can be approximated by the relation given by Equation (7) below, wherein $I_1$ is the moment of inertia of the first movable element 11, $I_2$ is the moment of inertia of the paired second movable elements 13, and $K_1$ and $K_2$ are spring constants of the first and second paired torsion springs 12 and 14, respectively.

$$(2\pi f_{1,2})^2 = \frac{1}{2}\left(\frac{K_1+K_2}{I_2}+\frac{K_1}{I_1}\right) \mp \frac{1}{2}\sqrt{\left(\frac{K_1+K_2}{I_2}+\frac{K_1}{I_1}\right)^2 - 4\frac{K_1 K_2}{I_1 I_2}} \quad (7)$$

It follows from Equation (7) that, if the difference between $I_1$ and $I_2$ is not large, both the frequencies $f_1$ and $f_2$ will change in accordance with the increase/decrease of $I_1$ and $I_2$. Therefore, in order to adjust the frequencies $f_1$ and $f_2$ toward desired frequencies $f_0$ and $2f_0$, respectively, the amount of increase/decrease of $I_1$ and $I_2$ has to be enlarged, or the adjustment of the frequency toward a desired value becomes impossible.

On the other hand, in Equation (7), if $I_1 \ll I_2$, the change of frequencies $f_1$ and $f_2$ resulting from adjustment of the inertia moments $I_1$ and $I_2$ of the two oscillators has such characteristic that the frequency $f_1$ changes in response to the increase/decrease of $I_1$ while the frequency $f_2$ changes in response to the increase/decrease of $I_2$; whereas the increase/decrease of $I_1$ causes little change of the frequency $f_2$ while the increase/decrease of $I_2$ causes little change of the frequency $f_1$.

Taking into consideration the characteristics of the oscillating system 160 as described above, the oscillating system 160 of this working example is arranged so that the permanent magnet 151 and the mass adjusting member 19 are provided only at the second oscillator 42, by which the relation $I_1 \ll I_2$ is satisfied while assuring improved scanning reproducibility to be described below. Particularly, setting the magnet 151 only at the second oscillator 42 does enable that, while making use of the magnet as a torque generating source, the mass of the magnet is used as the moment of inertia to assure the relation $I_1 \ll I_2$.

In the oscillating system 160 of this working example, based on laser beam projection, the first oscillator 11 and/or the mass adjusting member 19 is partly removed to decrease the appropriate amount of $I_1$ and $I_2$, by which the frequencies $f_1$ and $f_2$ are adjusted to satisfy the relation defined by Equation (1) or Equation (3). By measuring the amplitude of the oscillating system 160 by sweeping the driving frequency, any deviation of the frequencies $f_1$ and $f_2$ of the natural oscillation modes from their target values can be determined. Based on the thus measured values, necessary adjusting amounts $\delta I_1$ and $\delta I_2$ can be calculated in accordance with Equation (7). Then, by partly removing the first movable element and/or the mass adjusting member 19 by use of a laser beam, the frequencies $f_1$ and $f_2$ can be adjusted exactly as desired.

Particularly, with regard to the adjusting amount $\delta I_2$, by sharing the function for providing the moment of inertia to the second oscillator 42 between the magnet and the mass adjusting member, the adjusting amount $\delta I_2$ per volume to be removed by the laser beam machining is enlarged as compared with a case where a portion of the second movable element 13 itself is removed. Hence, the frequency adjustment of natural oscillation mode based on laser beam machining can be made fast, and inexpensive production is assured. Furthermore, since the adjusting amount $\delta I_2$ per volume to be removed is large, the frequency adjustable range can be made large even if the width of the second oscillator 42 is small. With these features, not only the scanning reproducibility to be described later is improved but also the oscillating system 160 can be made small in size. Therefore, where the device is produced from a monocrystal silicon substrate in accordance with the semiconductor manufacturing method, the production cost is lowered more.

The problems related to the scanning reproducibility which might occur when the light from a light source is scanningly deflected by an optical deflector, will be explained below with reference to FIGS. 5A and 5B. FIG. 5A is a schematic view for explaining the result of scan made by use of an idealistic optical deflector. An arrow in the drawing depicts a main-scan line as designed. The locus of scanned light spot 70 and the designed main-scan line are exactly registered with each other. Here, the light spot 70 positions are at regular intervals as illustrated, supposing an idealistic state. Namely, when the optical deflector makes completely constant-speed scan, the light emission timing of the light source for producing the light spot 70 is exactly regular. Furthermore, if approximately constant-speed scan is to made as in the optical deflector of this working example, an optical lens may be used to optically correct the velocity distribution in the section N-N', and equidistantly spaced light spot 70 positions as shown in FIG. 5A can be produced based on the constant light emission timing of the light source. Therefore, where the sinusoidal-wave combined driving shown in FIGS. 3 and 4 is exactly carried out, the scanning reproducibility would be idealistic.

On the other hand, FIG. 5B illustrates a case where there is a problem with the scanning reproducibility of the optical deflector. In the case of FIG. 5B, the locus of scan 71 is not registered with the designed main-scan direction, and there is a deviation in a direction (sub-scan direction) perpendicular to the main-scan line. As a result of such scanning, a light spot such as at 72 in FIG. 5B deviated by a distance J1 from the main-scan line would be produced. As typically shown in FIG. 5B, deviation in the sub-scan direction is different at each light spot, and the reproducibility of light spot position in this direction is quite low (hereinafter, such deviation will be referred to as "sub-scan position variation").

In addition to this, in FIG. 5B, as shown at a light spot 73, there occurs a deviation by a distance J2 in the main-scan direction, from an idealistic position (hereinafter, such deviation will be referred to as "main-scan position deviation"). Such deviation results from any variation in $\phi_1$ and $\phi_2$ of the sinusoidal-wave combined drive shown at Equation (6), phase delay from the driving signal of respective frequency components, or angular speed or angular acceleration of respective frequency components, or from mixture of any other frequency component. If the scanning reproducibility is unattainable and such sub-scan position deviation or main-scan position deviation as mentioned above is produced, when the optical deflector is used in an image forming apparatus, the spot position is not fixed and the image quality is degraded.

A first factor that would cause such scan position variation is the resistance which the oscillating system 160 receives from the ambience during the torsional oscillation.

Due to the torsional oscillation, the first oscillator 41 and the second oscillator 42 receive air resistance from the ambience. Since the oscillating system 160 has its natural oscillation modes set around the frequencies $f_0$ and $2f_0$ of the driving signal as described hereinbefore, it can be regarded as being torsionally oscillated at the resonance point. In such oscillation state, the energy being applied from the driving unit and the energy being extinguished into the ambience due to the air resistance are balanced.

However, when the first and second oscillators 41 and 42 are torsionally oscillated, the surfaces of these oscillators stir the ambience around the oscillation axis 17. By this stirring, the ambience around these oscillators is disturbed, resulting in that the air resistance applied to these oscillators changes with time moment. The variation in the air resistance causes a change in the oscillation state of the oscillating system 160 at the resonance point. As a result, variation of $\phi_1$ and $\phi_2$ of the sinusoidal-wave combined drive of scan, phase delay from the driving signal, or angular speed or angular acceleration of respective frequency components will occur.

Such variation can be reduced effectively if the oscillating system 160 is so shaped as to reduce the air resistance from the ambience. In the oscillating system 160, by reducing the width of only the second oscillator 42, the air resistance from the ambience can be reduced without degrading the optical scanning performance and, also, without enlarging the size of the oscillating system 160 in the oscillation axis 17 direction.

On the other hand, reducing the width of the first oscillator 11 will lead to a decrease of the effective reflection size of the reflection surface 22 in the main-scan direction. Therefore, when the optical deflector is used in an image forming apparatus, for example, in order to make uniform the light spot resolution (the number of light spots effectively separated during one scan) in successive scan operations, the optical scanning has to be done with a larger scan angle. This necessitates that the first and second torsion springs 12 and 14 have a large torsion angle and, to avoid break, the length of these torsion springs has to be prolonged. Furthermore, if the first and second oscillators 41 and 42 are driven with a large scan angle to make it sure the desired image formation, the ambience stirring function described above is strengthened. For these reasons, it is difficult to effectively reduce the variation of air resistance by making the width of the first oscillator 41 smaller.

The oscillating system 160 of this working example has a mass adjusting member 19 and permanent magnets 151 provided at the second oscillator 42, and it is possible to make the width of the second oscillator 42 smaller while keeping its moment of inertia. Therefore, the oscillating system 160 can have such structure that the variation of air resistance can be reduced without degrading the optical scanning performance, and that the frequencies of natural oscillation modes can be well adjusted exactly as described above.

Furthermore, because of oscillation at the resonance point, during the oscillation having large oscillation energy, the effect of air resistance is relatively small. Therefore, by keeping the moment of inertia large while using the mass adjusting member 19 and the permanent magnet 151 at the second oscillator, the oscillation energy during the drive can be held large and the adverse influence of the variation of air resistance to the scanning reproducibility can be reduced. Particularly, since keeping the inertia moment of only the second oscillator large does not require addition of weight to the first oscillator 41, the scanning reproducibility can be improved without magnifying the deformation of the reflection surface 11 by the self-weight of the first movable element 11, during the driving.

In this working example, comparing the widths of the first and second oscillators 41 and 42, the width of the second oscillator 42 is made smaller. In an oscillating system with plural oscillators, every oscillator receives such varying air resistance described above. Hence, if the number of oscillators increases, although the characteristic optical scanning as described hereinbefore can be accomplished more assuredly with low power consumption based on plural natural oscillation modes, more variation factors are presented on the other hand. However, this could be avoided by making the width of the second oscillators 42 smaller than the first oscillator 41 and by providing a permanent magnet 151 and a mass adjusting member 19 to enlarge the moment of inertia of the second oscillator 42, as in this working example. This structure provides an advantage that increasing the number of oscillators more effectively increases the oscillation energy, than the increase of the number of variation factors of air resistance, and the scanning reproducibility is improved by that.

In this working example, as shown in FIG. 1, the second oscillator 42 actually comprises a pair of oscillators of the same structure. Hence, two sets of fixed coils (driving means) 152 and permanent magnets (torque producing means) 151 can be provided in the oscillating system 160, and therefore the system can be driven at low power consumption. As shown in FIG. 2A, the oscillating system 160 is supported at its opposite ends by the stationary member 150. This effectively avoids unwanted oscillation of the oscillating system 150 during the driving. Furthermore, even if a shock is given to the oscillating system 160, the structure will be tough enough to endure.

On the other hand, a second factor that would cause scan position variation is unwanted oscillation of the oscillating system 160 and an inertia force resulting therefrom.

Any oscillations in directions other than the torsional oscillation about the oscillation axis 17 are all unwanted oscillations. If such unwanted oscillation occurs, the motion of the first oscillator 41 would be a combined oscillation of the component torsionally oscillating about the torsional axis 17 and the unintendedly produced unwanted oscillation. This results in scan position variation described hereinbefore. Furthermore, as will be described later, unwanted oscillation will cause coupled oscillation of two natural oscillation modes about the oscillation axis to be used for the optical scan, to worsen the scan position variation.

Particularly, in the oscillating system 160 of this working example shown in FIG. 1, the rigidity in the direction of a normal to the sheet of the drawing and in the direction along the sheet of the drawing and perpendicular to the oscillation axis 17 is relatively low. This is a notable feature in oscillating systems wherein a plurality of oscillators and torsion springs are resiliently supported, in series, about the same oscillation axis. Unwanted oscillations in these two directions may be caused if the gravity centers of the first oscillator 41 and the second oscillator 42 shift from the oscillation axis 17.

Figure 7A:
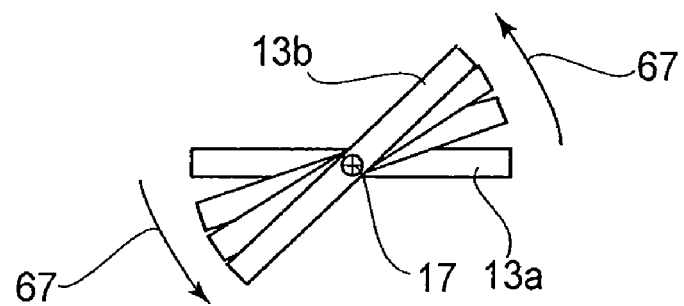
FIG. 7A is a schematic view for explaining torsional oscillation in an idealistic state without gravity center shift.
Figure 7B:
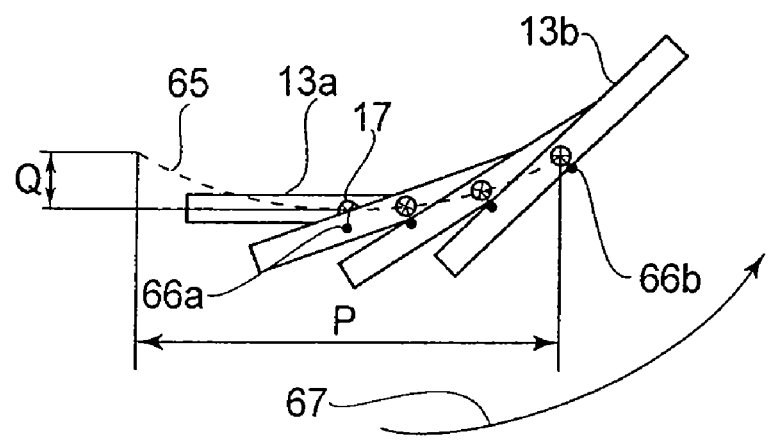
FIG. 7B is a schematic view for explaining torsional oscillation in a state with gravity center shift.
Figure 7C:
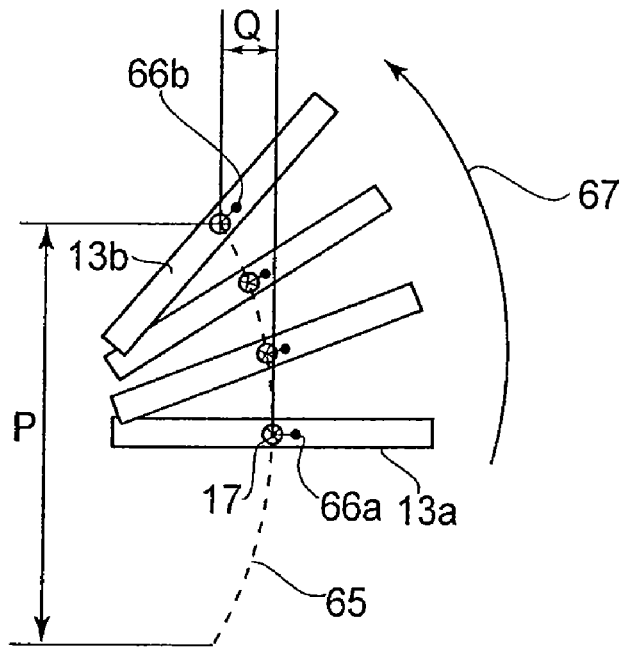
FIG. 7C is a schematic view for explaining torsional oscillation in another state with gravity center shift.

FIGS. 7A-7C are schematic views for explaining the relationship between such gravity center shift and the unwanted oscillation. Specifically, FIGS. 7A, 7B and 7C correspond to the section taken along a line A-A in FIG. 1, and illustrate the oscillating motion of the second oscillator 13 from the scan center position (13a) to the position (13b) corresponding to a quarter of one cycle, along a direction of an arrow 67. FIG. 7A shows an idealistic state without gravity center shift. FIG. 7B shows a state in which, as depicted by the second movable element 13a and its gravity center 66a, there is a shift in the thickness direction of the second movable element 13a. FIG. 7C shows a state in which there is a shift in the widthwise direction of the second movable element 13a. For convenience of explanation of the relationship between the gravity center shift and the unwanted oscillation, it is assumed here that the second movable element 13, constituting the second oscillator, is not equipped with a permanent magnet 151 and a mass adjusting member 19.

As shown in FIG. 7A, in an idealistic state without gravity center shift, torsional oscillation about the oscillation axis 17 is produced in response to the driving signal of frequencies $f_0$ and $2f_0$.

On the other hand, in FIG. 7B, since the gravity center 66a is deviated from the oscillation axis 17, in response to torsional oscillation, an inertia force is produced in the second movable element 13a in the direction from the oscillation axis 17 to the gravity center 66a. Due to this inertia force, the second movable element 13a torsionally oscillates toward the position shown at 13b, so that the position of the oscillation axis 17 changes along a curve 65 of FIG. 7B. Since the oscillating motion from the position 13a to the position 13b corresponds to a quarter of one cycle, the oscillating motion in the direction of an arrow P in FIG. 7B has the same frequency as the torsional oscillation, and the oscillation in the direction of an arrow Q has a frequency twice the torsional oscillation.

Furthermore, as shown in FIG. 7C, if the gravity center 66a is deviated in the widthwise direction of the oscillator 13a, similarly the torsional oscillation is accompanied by unwanted oscillation, such as depicted by a curve 65. In this case as well, although the direction is different from the case of FIG. 7B, there occurs oscillation in the direction of an arrow P having the same frequency as the torsional oscillation about the oscillation axis 17, and oscillation in the direction of an arrow Q having a double frequency.

As described above, a gravity center shift will cause unwanted oscillation in the direction of an arrow P or Q. Although unwanted oscillation in the sectional view of FIGS. 7A-7C has been discussed, a gravity center shift in any other direction would cause unwanted oscillation of characteristic frequency, based on a similar mechanism, and the scan position reproducibility would be degraded thereby.

Particularly, the oscillation in the Q direction has a frequency twice the frequency of the torsional oscillation. In the oscillating system 160 of this example, there is an approximately "double" relationship between the frequencies $f_1$ and $f_2$ of the natural oscillation modes. Hence, due to the oscillation in direction 67 excited at the reference frequency $f_0$ of the driving signal, unwanted oscillation in the direction of an arrow Q having a double frequency is produced. Then, in response to this unwanted oscillation and due to a gravity center shift of any portion of the oscillating system 160, an inertia force having a torque component about the oscillation axis 17 is produced. An example is a case that the second oscillator 42 has both a gravity center shift of FIG. 7B and a gravity center shift of FIG. 7C, at the same time. In this manner, a natural oscillation mode of frequency $f_2$ having large amplitude amplification factor is unintendedly exited. If there occurs coupled oscillation phenomenon of natural oscillation mode about the oscillation axis 17 as described hereinbefore, the scan position will shift periodically or show an approximately periodic change with a characteristic frequency component wherein the amplitude or phase varies at random.

In this working example, the permanent magnet 151 and the mass adjusting member 19 are disposed sandwiching the oscillation axis 17 therebetween. This makes it quite easy to ensure that the oscillation axis 17 extends through the gravity center position of the second oscillator 42. Thus, unwanted oscillation of the oscillating system 160 such as described hereinbefore is well reduced, and also the inertia force resulting therefrom is diminished. As a result, coupling oscillation of the natural oscillation modes is avoided. Hence, the scan position variation is well reduced, and superior scanning reproducibility can be achieved.

If there is a gravity center shift, laser beam machining such as describe hereinbefore may be made to the mass adjusting member 19 to partly remove the mass thereof, so that the gravity center is adjusted and correctly positioned on the oscillation axis 17.

In accordance with this working example of the present invention, due to the effect of the permanent magnet 151 and the mass adjusting member 19 provided only at the second oscillator 42, the frequencies of plural natural oscillation modes can be easily adjusted to a desired value, and in addition to this, the scanning reproducibility is improved significantly.

SECOND WORKING EXAMPLE

Figure 8:
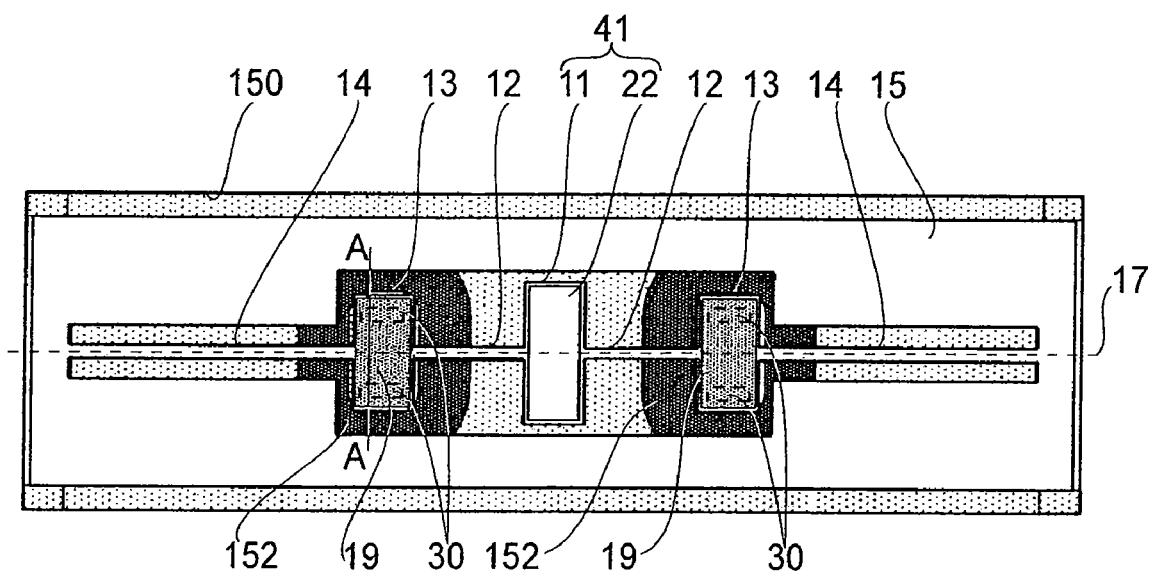
FIG. 8 is a plan view of an optical deflector according to a second working example of the present invention.
Figure 9:
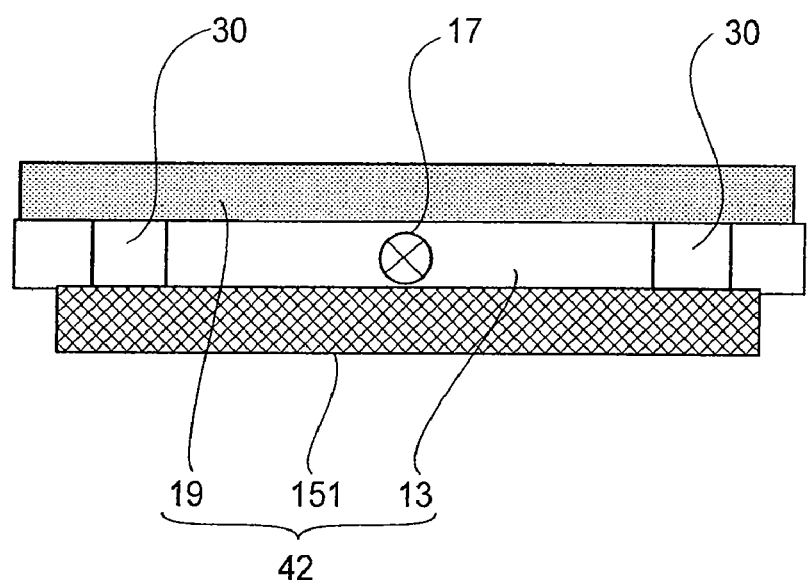
FIG. 9 is a cross-section of the optical deflector according to the second working example of the present invention, taken along a line A-A in FIG. 8.

FIGS. 8 and 9 show an optical deflector according to a second working example of the present invention. FIG. 8 is a plan view, and FIG. 9 is a section taken along a line A-A in FIG. 8. In these drawings, the components having a similar function as those of FIG. 1 are denoted by like numerals. Hereinafter, description of those portions having a similar function as the first working example will be omitted, and only distinctive features wile be explained. As shown in FIGS. 8 and 9, the optical deflector of this example comprises a first movable element 11, first torsion springs 12, second torsion springs 14, a supporting member 15, mass adjusting members 19, a reflection surface 22, a supporting member 150 and permanent magnets 151 all of which are similar to those of the first working example in respect to the material, structure and function.

The second movable element 13 of this working example is formed with cavities 30 which, as shown in FIGS. 8 and 9, extend approximately in parallel to the oscillation axis 17. With the provision of these cavities 30, as depicted by broken lines in FIG. 8 and shown in FIG. 9, in some portions the mass adjusting member 19 is not adhered to the second movable element 13. These cavities 30 are formed simultaneously as the oscillating system 160 is produced from a monocrystal silicon substrate, by dry etching.

With the provision of the cavities 30, the frequency adjustable range of the natural oscillation mode during the process of partly removing the mass adjusting member by a laser beam, having been described with reference to the first working example, can be widened and, also, the adjustment can be done at high speed. Furthermore, the gravity center position adjustable range of the oscillating system 160 becomes wider, and the adjustment can be done at high speed.

Figure 10A:
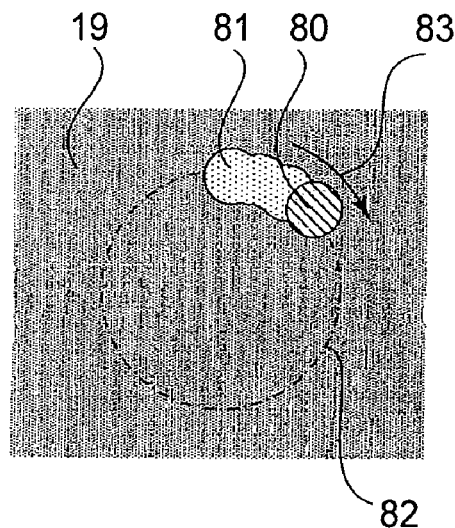
FIG. 10A is a plan view for explaining one process of laser beam machining processes in the second working example of the present invention.
Figure 10B:
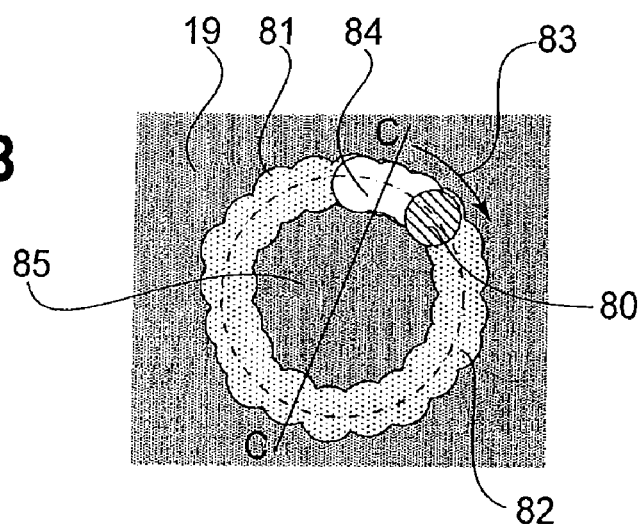
FIG. 10B is a plan view for explaining another process of laser beam machining processes in the second working example of the present invention.
Figure 10C:
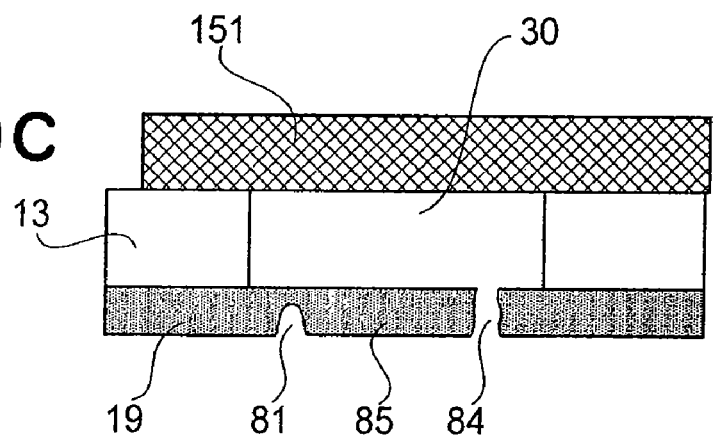
FIG. 10C is a sectional view taken along a line C-C in FIG. 10B, for explaining the process in the second working example shown in FIG. 10B.

FIG. 10A-10C are schematic views for explaining the process of partly removing the mass adjusting member 19 in this working example. FIG. 10A is a plan view of the sample in the initial stage of laser beam machining. FIG. 10B is a plan view showing the state in which the procedure has advanced from the state of FIG. 10A. FIG. 10C is a section taken along a line C-C in FIG. 10B. It is seen from FIG. 10C that, due to the presence of the cavity 30, the mass removal portion 85 which is a portion of the non-adhered region of the mass adjusting member can be removed without irradiation with the laser beam.

First of all, as shown in FIG. 10A, a machining laser beam spot 80 is scanningly shifted along a machining locus 82 so as to trace an arcuate loop in the rotational direction 83. The machining laser beam spot 80 is being emitted with an output and a pulse frequency suited to the machining of the mass adjusting member 19. As shown, by means of this machining laser spot 80, a machined portion 81 along the machining locus 82 is formed.

FIG. 10B illustrates the state after the machining laser spot 80 has circulated by appropriate times along the machining locus 82. As shown, there is a through-opening 84 formed along the machining locus 82. FIG. 10C shows this in section. The machining laser beam 80 further circulates along the machining locus 82 so as to remove the periphery of the mass removal portion 85 along an arcuate loop. Since the mass removal portion 85 is not adhered to the second movable element 13 due to the presence of the cavity 30, as shown in FIG. 10C, with the procedure described above it is separated and removed from the second movable element 13.

In the procedure described above, if the amount of removal from the mass producing member 19 should be increased, the diameter of the machining locus 82 may be enlarged. A larger mass can be removed fast, in that case. As a matter of course, the shape of the machining locus 82 is not limited to an arcuate loop described above.

In accordance with this working example as described above, due to the effect of the cavity 30, the amount of mass removal from the mass adjusting member can be enlarged and the mass can be removed fast. This enables enlargement of the frequency adjustable range for the natural oscillation modes or the gravity position adjustable range of the oscillating system 106, and high-speed adjustment as well.

Furthermore, because of the provision of the cavity 30 in the second movable element 13 in this example, the mass adjusting member 19 can have a planar shape. This facilitates the assembling for adhesion.

Figure 11:
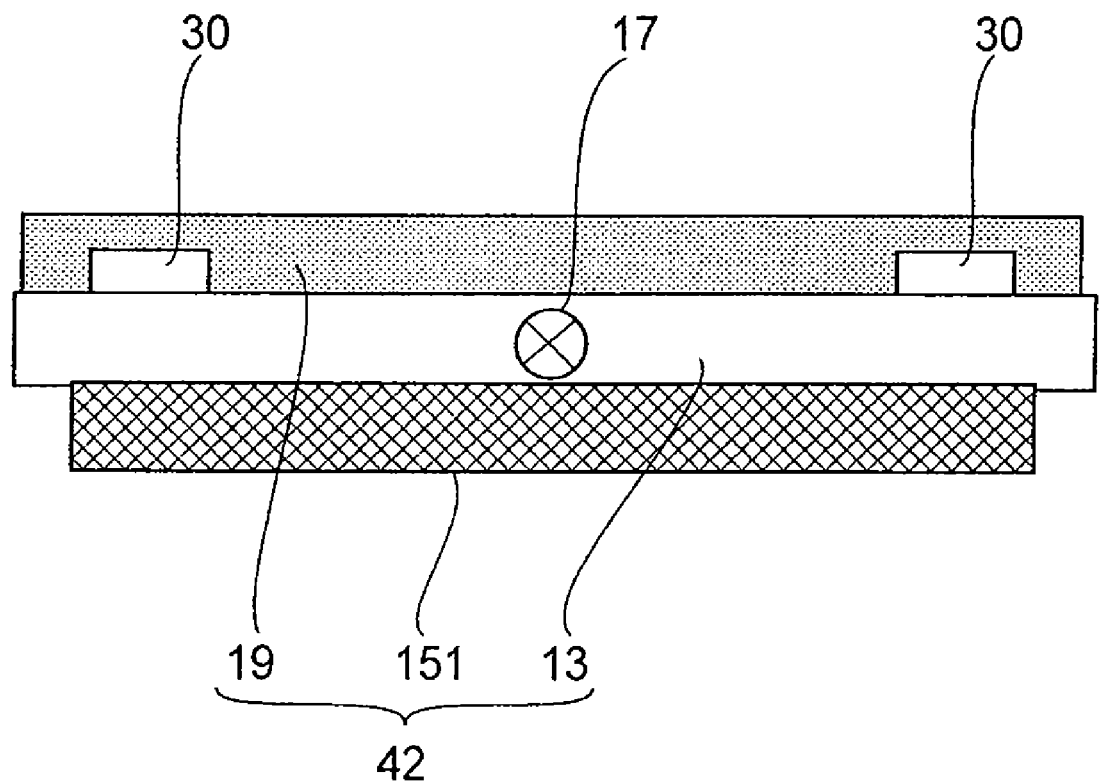
FIG. 11 is a sectional view for explaining a modified form of the second working example of the present invention.

The second movable element 13 and the mass adjusting member 19 of this working example may have a shape such as shown in FIG. 11. FIG. 11 is a section taken along a line A-A in FIG. 8. As compared with the example of FIG. 9, in the structure shown in FIG. 11, the cavities 30 are formed in the mass adjusting member 19. Even in such case, similar advantageous effects are obtainable in regard to the mass removal using laser beam irradiation.

THIRD WORKING EXAMPLE

Figure 12A:
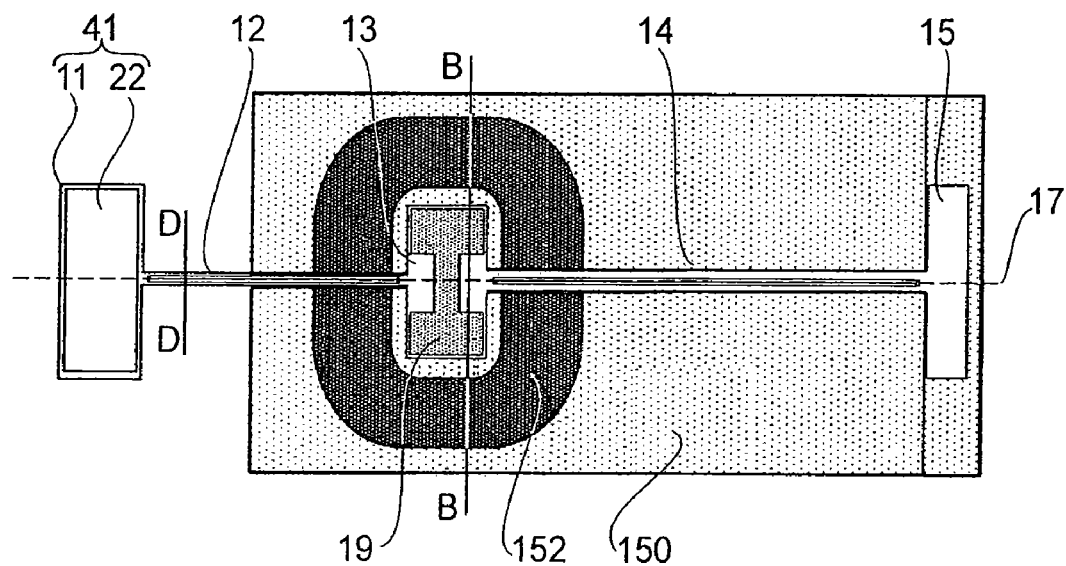
FIG. 12A is a plan view of an optical deflector according to a third working example of the present invention.
Figure 12B:
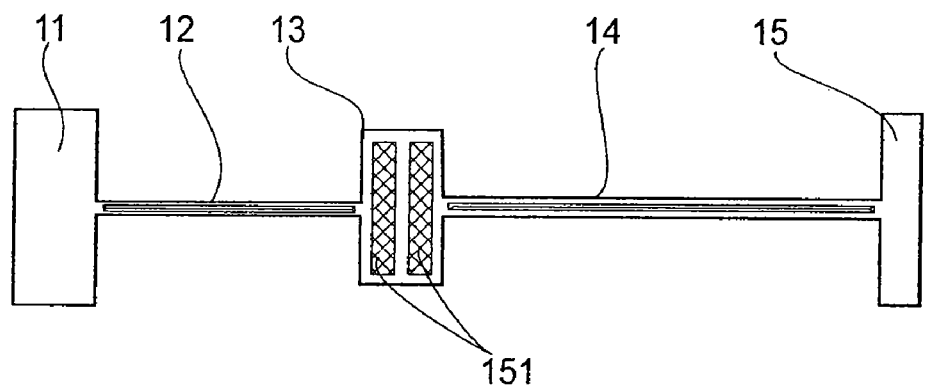
FIG. 12B is a plan view, showing the structure at a side of the oscillating system where no reflection surface is formed, in the third working example of the present invention.
Figure 13:
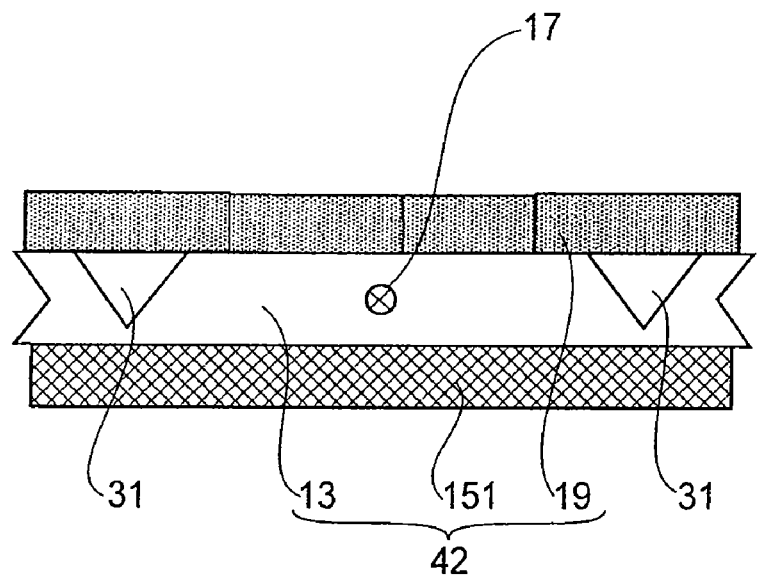
FIG. 13 is a sectional view of the optical deflector according to the third working example of the present invention, taken along a line B-B in FIG. 12A.
Figure 14:
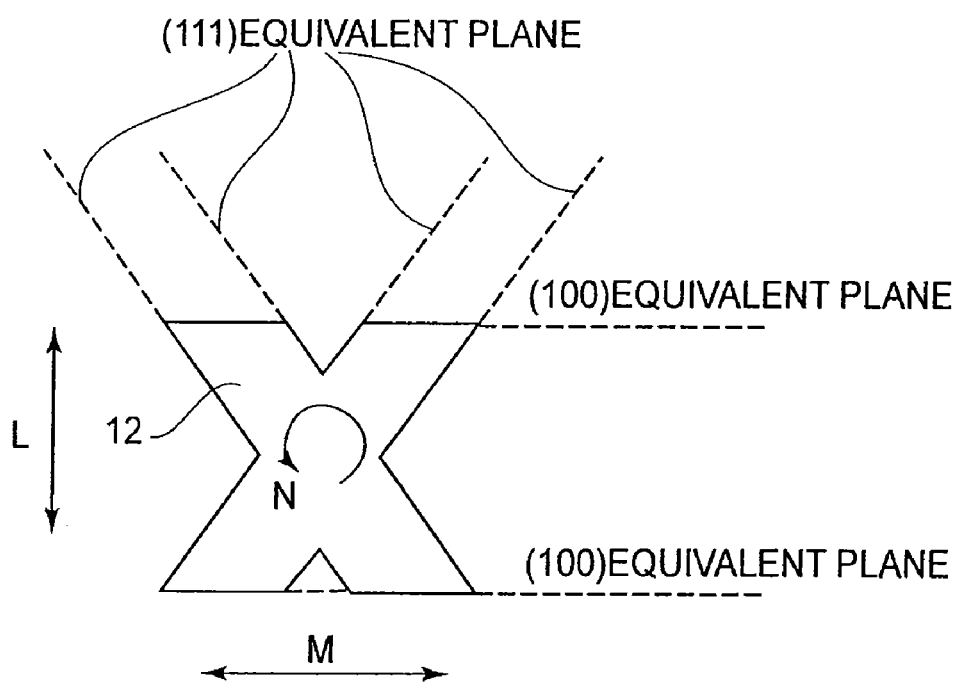
FIG. 14 is a sectional view of the torsion spring in the third working example of the present invention, taken along a line D-D in FIG. 12A.

FIGS. 12A, 12B, 13 and 14 show an optical deflector according to a third working example of the present invention. FIG. 12A is a plane view of the side of an oscillating system 160 where a reflection surface 22 is formed, and FIG. 12B is a plan view of the opposite side of the oscillating system. FIG. 13 is a section taken along a line B-B in FIG. 12A, and FIG. 14 is a section taken along a line D-D in FIG. 12A. In these drawings, the components having a similar function as those of the first working example are denoted by like numerals. Hereinafter, description of those portions having a similar function as the first working example will be omitted, and only distinctive features wile be explained. As shown in FIGS. 12A and 12B, the optical deflector of this example comprises a first movable element 11, a supporting member 15, a reflection surface 22, a supporting member 150 and permanent magnets 151 all of which are similar to those of the first working example in respect to the material, structure and function.

The oscillating system 160 of this working example is made integrally from monocrystal silicon by anisotropic etching using an alkali aqueous solution, to be described later. In this example, as shown in FIGS. 13 and 14, the oscillating system 160 has a characteristic shape as surrounded by crystal equivalent planes (surfaces) of monocrystal silicon.

As shown in FIG. 13, the second movable element 13 of this working example is formed with notches 31 extending in parallel to the oscillation axis 17. These notches 31 have a similar effect as the cavities 30 of the second working example, in the process of partly removing the mass adjusting member 19 by a laser beam. In addition, with the provision of these notches 31 as the cavities, as compared with the second working example, a large mass can be easily removed from the mass adjusting member 19 by the laser beam machining while keeping the moment of inertia of the second movable element 13 large. Furthermore, since the cavity can be defined only by using a planar member as the mass adjusting member 19, the assembling for adhesion is easy. Yet further, since there is no cavity at the back remote from the surface where the notches 31 are formed, the back surface can be used for adhesion of the permanent magnets 151.

On the other hand, as shown in FIG. 14, the first torsion spring 12 has an X-shaped sectional shape surrounded by (100) equivalent planes and (111) equivalent planes of monocrystal silicon. Also, the second torsion spring 13 has a similar sectional shape.

Because of this X-shaped sectional shape of the first torsion spring 12 and the second torsion spring 13, the oscillating system 160 of this working example has a large rigidity with respect to the direction of an arrow L and the direction of an arrow M in FIG. 14, but the rigidity in a direction of an arrow N about the torsional axis 17 is relatively weak. Namely, as a torsional spring, it can be easily twisted around the torsional axis and is difficult to be flexed in other directions. Hence, unwanted oscillations in the directions of arrows L and M are effectively avoided. Since the scan position variation is effectively reduced in this manner, good scanning reproducibility is accomplished.

This working example uses only one second torsion spring 14, and the oscillating system 160 is supported by the stationary member 150 in a cantilever structure. Hence, even if deformation occurs in the stationary member 150 due to a temperature change or any external force, little stress is transmitted to the oscillating system 160 to cause deformation thereof. Therefore, the gravity center position having been adjusted in alignment with the oscillation axis during manufacture is unchangeable with the temperature change or any external force, and good scanning reproducibility is assured regardless of such temperature change or external force. Furthermore, in this structure, little stress is transmitted in the direction of the oscillation axis 17 as a result of a temperature change. Therefore, the frequencies $f_1$ and $f_2$ of the natural oscillation modes about the oscillation axis 17 may have approximately the same rate of change and, hence, the phase difference of the two frequency components during sinusoidal-wave combined driving is stabilized.

Figure 15:
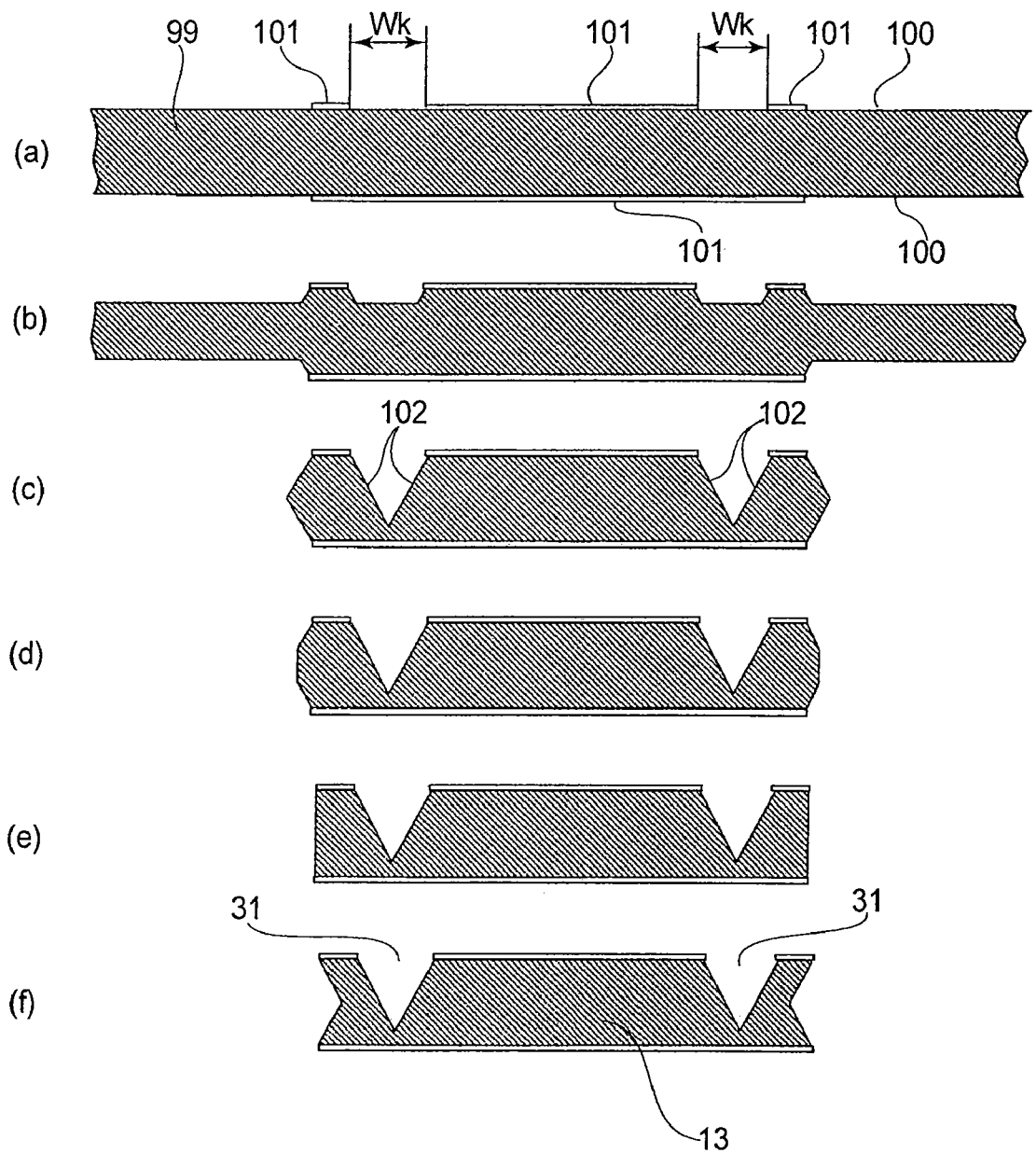
FIG. 15 is a sectional schematic view for explaining the processes for producing an oscillator in the third embodiment of the present invention.
Figure 16:
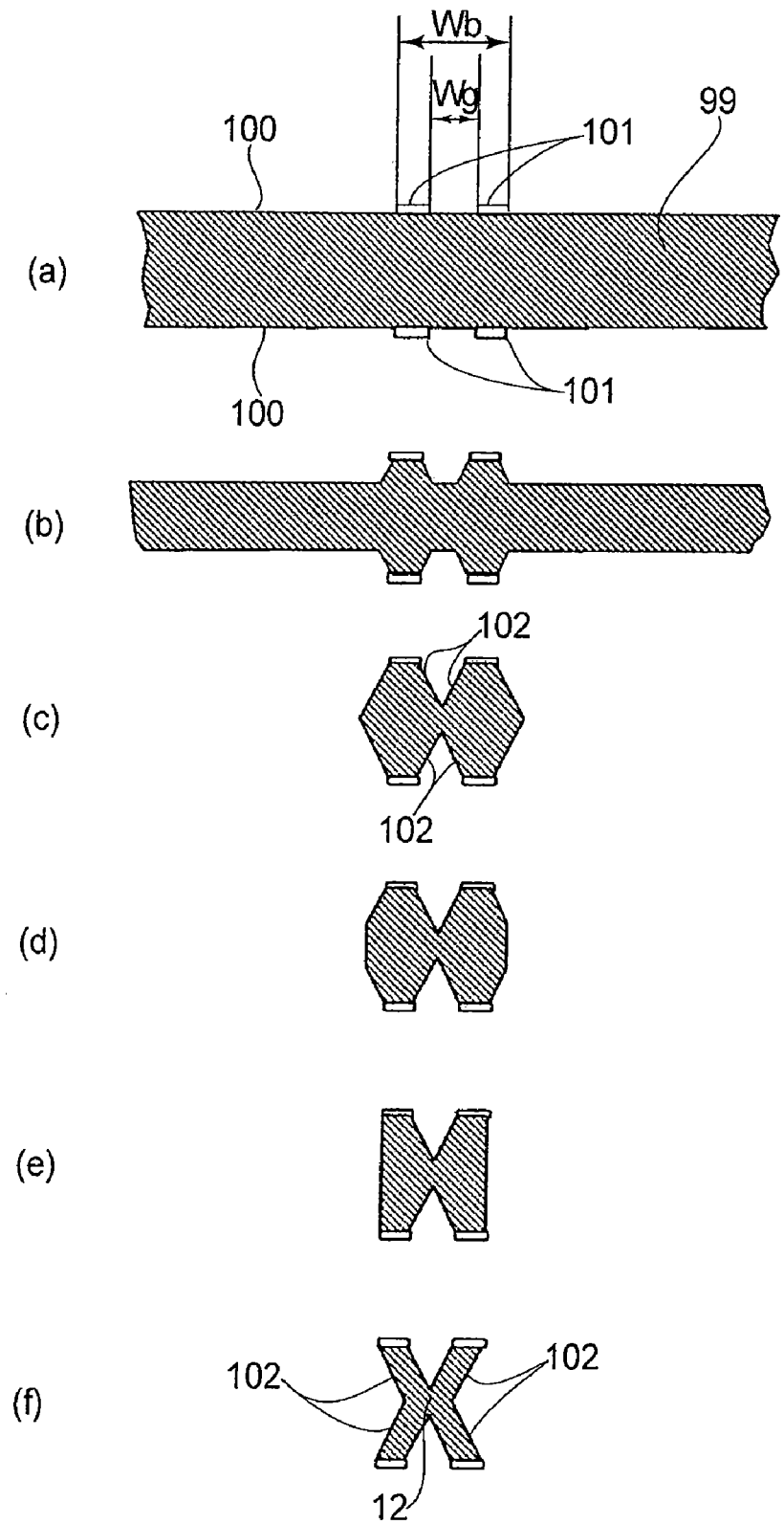
FIG. 16 is a sectional schematic view for explaining the processes for producing a torsion spring in the third embodiment of the present invention.

Next, alkali aqueous solution etching process for the oscillating system 160 in this working example will be explained. FIGS. 15 and 16 show shapes within an alkali aqueous solution, corresponding to the sections of FIGS. 13 and 14. In FIGS. 15 and 16, the sectional shapes at (a) to (f) are at corresponding timings in the process, respectively. First, at (a), a silicon substrate 99 having (100) equivalent planes 100 in the illustrated orientation and having protection films 101 formed thereon is used, and patterning of the protection films 101 is carried out. In this working example, the protection film 101 comprises a silicon nitride film. The silicon nitride film can be formed by using a chemical vapor-phase composing method. Patterns can be formed in the protection films 101 as shown at (a), based on photolithography and dry etching.

Here, as shown in FIG. 15, openings having a width Wk are formed. Also, as shown in FIG. 16, openings of widths Wb and Wg are formed. These widths are determined in accordance with the angle to be defined between the (111) equivalent plane and the (100) equivalent plane and the thickness of the silicon substrate 99. By appropriately setting these widths, required torsion spring constants and sizes of cavities can be achieved on the basis of the specifications of the oscillating system 160.

Subsequently, at (b), the substrate is immersed into an alkali aqueous to start the etching. This working example used an aqueous solution of potassium hydroxide. Since the aqueous solution such as potassium hydroxide aqueous solution shows a slower etching speed with respect to the (111) equivalent surface of monocrystal silicon than to other surfaces, a shape surrounded by the (111) equivalent surfaces can be produced well. As the etching proceeds, the substrate is etched in the order as depicted at (b) to (f). Finally, at (f), the second movable element 13, notches 31, first torsion spring 12 and second torsion spring 13, surrounded by the (100) equivalent surfaces 100 and the (111) equivalent surfaces 102, are formed. After that, the protection films 101 at the opposite surfaces are removed by dry etching. Then, a reflection film 22 is formed by vacuum vapor deposition, whereby the oscillating system 160 is provided.

As described above, in this working example, the second movable element 13, notches 31, first torsion spring 12 and second torsion spring 13 are formed simultaneously by single alkali aqueous solution etching. As a result, the production process is simplified, and the oscillation system 160 can be produced inexpensively.

Particularly, the (111) equivalent surface of monocrystal silicon has a slower etching speed, and this enables precisely forming the shape of the notch 31, first torsion spring 12 and the second torsion spring 13. With the precision machining of the notches 31, the moment of inertia or gravity center position of the second oscillator 42 can be determined very precisely. Furthermore, with the precision machining of the first and second torsion springs 12 and 13, the torsion spring constant can be determined very precisely. This leads to the possibility of omitting the process of partly removing the mass of the mass adjusting member for adjustment of the gravity center position or frequencies of the natural oscillation modes, or reducing the amount of removal to shorten the time required for the adjustment. This further decreases the production cost of the oscillating system 160.

The mass adjusting member 19 of this working example may be made of a metal magnet containing cobalt which is a hard magnetic material. In that occasion, the mass adjusting member 19 may be adhered to the second movable element 13 and, after that, a permanent magnet 151 before magnetization (polarization) may be adhered thereto. After this, it is polarized by using a polarizing machine. Hence, in this case, the mass adjusting member 19 functions as a permanent magnet having magnetic poles of the same orientation as the permanent magnet 151.

As a result, the amount of permanent magnet provided to the oscillating system 160 increases, and hence the oscillating system 160 can be driven with slower power consumption. Furthermore, since the electric current to be applied to the fixed coils 152 reduces, heat generation is slowed down. Hence, a change of the frequency of natural oscillation mode of the oscillating system is well reduced.

As shown in FIG. 12, the mass adjusting member 19 of this working example has such shape that it is thick at its opposite end portions and thin at its central portion. As compared with a planar plate of rectangular shape, the mass per inertia moment about the oscillation axis 17 can be lightened. This enables to keep constant the frequencies of the natural oscillation modes about the oscillation axis 17 of the oscillating system 160 while, on the other hand, changing the frequency of any other natural oscillation modes. If the frequencies $f_1$ and $f_2$ of the natural oscillation modes about the oscillation axis 17 and a characteristic oscillation applied due to any disturbance are present, the frequency of the natural oscillation modes of the oscillating system 160 can be separated from the frequency of such oscillation. Therefore, unwanted oscillation can be reduced more, and an optical deflector having better scanning reproducibility is achieved.

As described above, use of the mass adjusting member 19 of this working example is effective to provide enhanced latitude for setting the frequency of a natural oscillation mode, other than the frequencies $f_1$ and $f_2$ of the natural oscillation modes about the oscillation axis 17 of the oscillating system 160, as desired.

FOURTH WORKING EXAMPLE

Figure 17:
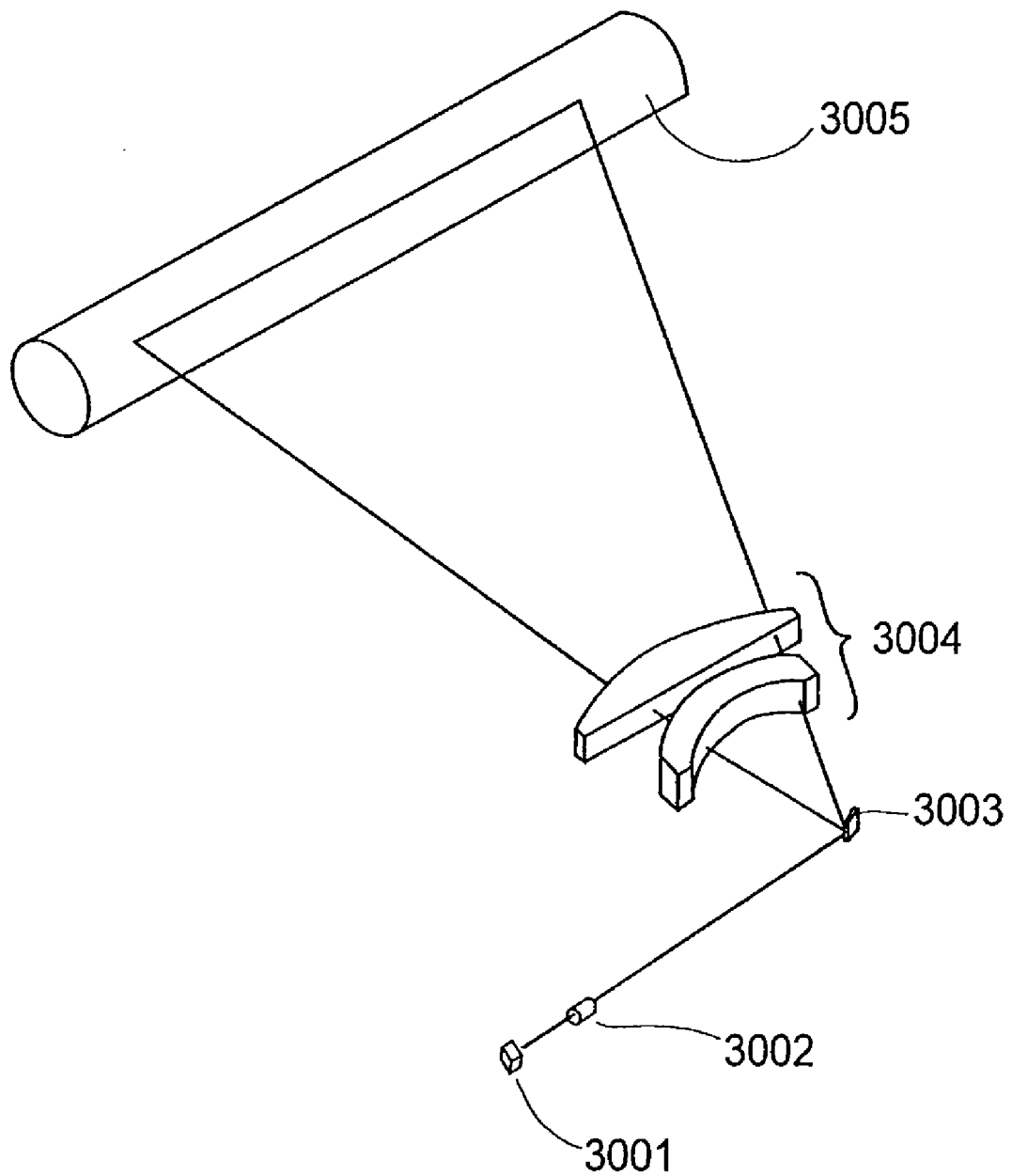
FIG. 17 is a perspective view, showing a working example of an optical instrument having an optical deflector of the present invention.
Figure 18:
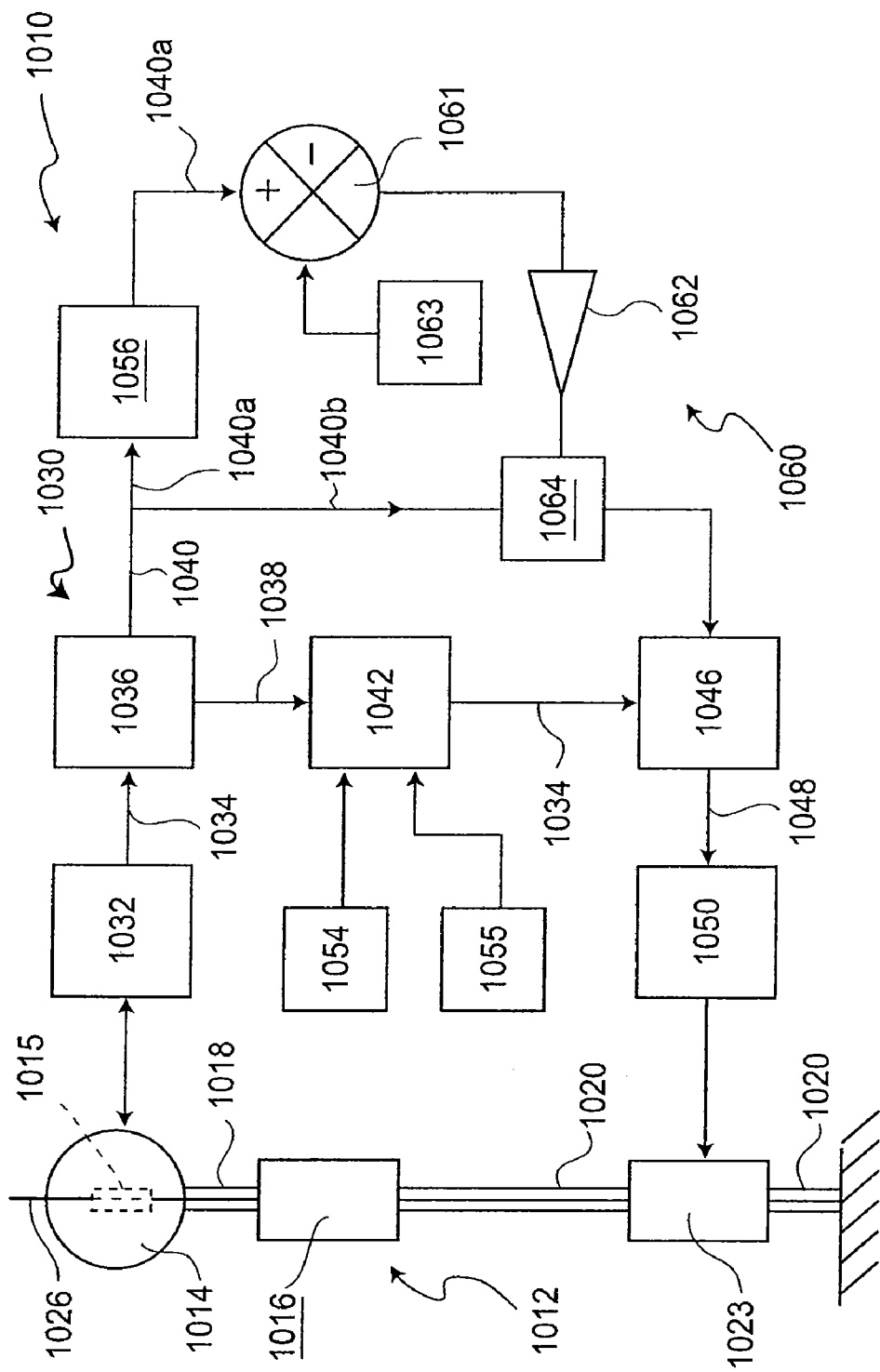
FIG. 18 is a block diagram for explaining an optical deflector of known type.

FIG. 17 is a schematic and perspective view, showing a working example of an optical instrument into which an optical deflector according to the present invention is incorporated. In this example, an image forming apparatus is shown as the optical instrument. In FIG. 17, denoted at 3003 is an optical deflector according to the present invention, and it functions to one-dimensionally scan the light incident thereon. Denoted at 3001 is a laser light source, and denoted at 3002 is a lens or lens group. Denoted at 3004 is a writing lens or lens group, and denoted at 3005 is a drum-shaped photosensitive member.

A laser beam emitted from the laser light source 3001 has been modulated by predetermined intensity modulation related to the timing of deflective scan of light. The intensity-modulated light goes through the lens or lens group 3002, and it is one-dimensionally scanningly deflected by means of an optical scanning system (optical deflector) 3003. The scanningly deflected laser beam is focused by the wring lens or lens group 3004 on the photosensitive member 3005 to form an image thereon.

The photosensitive member 3005 rotates about a rotational axis in a direction perpendicular to the scan direction, and it is uniformly charged by means of a charger, not shown. By scanning the photosensitive member surface with light, an electrostatic latent image is formed in the scanned surface portion. Subsequently, by using a developing device, not shown, a toner image is produced in accordance with the electrostatic latent image, and the toner image is then transferred to and fixed on a transfer sheet, not shown, whereby an image is produced on the sheet.

With the use of the optical deflector 3003 of the present invention, the angular speed of deflective scan of light can be made approximately even within the effective region of the photosensitive member 3005 surface. Furthermore, with the use of the optical deflector of the present invention, scan position variation is reduced, and an image forming apparatus capable of producing a sharp image is accomplished.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-149940 filed May 30, 2006, for which is hereby incorporated by reference.

What is claimed is:

1. An optical deflector, comprising:
an oscillating system; and
a driving system configured to drive said oscillating system;
wherein said oscillating system includes a first oscillator, a first torsion spring, a second oscillator, a second torsion spring and a supporting member,
wherein said first oscillator includes a first movable element having a reflecting surface,
wherein said second oscillator includes a second movable element having a moment-of-inertia adjusting member,
wherein said first movable element is resiliently supported by said second movable element through said first torsion spring, for torsional oscillation about an oscillation axis,
wherein said second movable element is resiliently supported by said supporting member through said second torsional spring, for torsional oscillation about the oscillation axis, and
wherein said oscillating system has at least two natural oscillation modes having different frequencies, about the oscillation axis.

2. An optical deflector according to claim 1, wherein said second oscillator is provided by said second movable element having said moment-of-inertia adjusting member and a magnet, and wherein said magnet and said moment-of-inertia adjusting member are disposed sandwiching the oscillation axis there between.

3. An optical deflector according to claim 1, wherein said second oscillator, having said moment-of-inertia adjusting member, a magnet and said second movable element, has a gravity center aligned with the oscillation axis.

4. An optical deflector according to claim 1, wherein said oscillating system has natural oscillation modes of two different frequencies, one frequency being approximately double or triple the other frequency.

5. An optical deflector according to claim 1, wherein an interspace is defined between said second movable element and said moment-of-inertia adjusting member.

6. A method of producing an optical deflector as recited in claim 1, comprising:
a step of projecting laser light to said moment-of-inertia adjusting member to remove a portion of said moment of inertia adjusting member.

7. An optical instrument, comprising:
a light source;
an optical deflector as recited in claim 1; and
one of a photosensitive member and an image display member;
wherein said optical deflector is configured to deflect light from said light source and to direct at least a portion of the deflected light onto said photosensitive member or image display member.

* * * * *